US012639374B2

(12) United States Patent
Wong et al.

(10) Patent No.: US 12,639,374 B2
(45) Date of Patent: May 26, 2026

(54) CONTENT BASED RELATED VIEW RECOMMENDATIONS

(71) Applicant: Tableau Software, LLC, Seattle, WA (US)

(72) Inventors: Connie Hong-Ying Wong, Vancouver (CA); Xiangbo Mao, Vancouver (CA); Kazem Jahanbakhsh, Vancouver (CA); Eric Roy Brochu, Vancouver (CA)

(73) Assignee: Tableau Software, LLC, Seattle, WA (US)

( * ) Notice: Subject to any disclaimer, the term of this patent is extended or adjusted under 35 U.S.C. 154(b) by 125 days.

(21) Appl. No.: 18/402,714

(22) Filed: Jan. 2, 2024

(65) Prior Publication Data

US 2024/0134914 A1 Apr. 25, 2024

Related U.S. Application Data

(63) Continuation of application No. 17/158,911, filed on Jan. 26, 2021, now abandoned.

(51) Int. Cl.
*G06F 16/904* (2019.01)
*G06F 16/9032* (2019.01)
(Continued)

(52) U.S. Cl.
CPC ...... *G06F 16/904* (2019.01); *G06F 16/90332* (2019.01); *G06F 16/9035* (2019.01);
(Continued)

(58) Field of Classification Search
CPC ............. G06F 16/904; G06F 16/90332; G06F 16/9035; G06F 16/908; G06F 16/909; G06N 20/00; G06Q 10/06
See application file for complete search history.

(56) References Cited

U.S. PATENT DOCUMENTS 7,010,364 B1 3/2006 Singh et al.
8,099,674 B2 1/2012 Mackinlay et al.
(Continued)

FOREIGN PATENT DOCUMENTS

JP 2007249354 A 9/2007
JP 2008217480 A 9/2008
(Continued)

OTHER PUBLICATIONS

Adam, Frederic et al., "Developing Practical) Decision Support Tools Using Dashboards of Information," In: Handbook on Decision Support Systems 2. International Handbooks Information System, Springer, Berlin, Heidelberg, 2008, pp. 151-173.
(Continued)

*Primary Examiner* — Ajay M Bhatia
*Assistant Examiner* — Zuheir A Mheir
(74) *Attorney, Agent, or Firm* — Morgan, Lewis & Bockius LLP

(57) ABSTRACT

A method identifies related data visualizations. A computing device displays a data visualization according to a data source. The data visualization displays of one or more first data fields from the data source, and is displayed according to one or more first metadata fields. The device identifies a collection of predefined data visualizations for the data source. For each element in the collection, the device computes a respective ranking according to a plurality of influence scores, each influence score computed according to comparing data fields and metadata fields of the respective predefined data visualization to the one or more first data fields and the one or more associated first metadata fields. The device then selects a subset of the predefined data visualizations that have top ranking and provides an ordered list of the selected subset, including at least one influence score for each included data visualization.

20 Claims, 13 Drawing Sheets

(51) Int. Cl.
| | |
|---|---|
| *G06F 16/9035* | (2019.01) |
| *G06F 16/908* | (2019.01) |
| *G06F 16/909* | (2019.01) |
| *G06N 20/00* | (2019.01) |

(52) U.S. Cl.
CPC .......... *G06F 16/908* (2019.01); *G06F 16/909* (2019.01); *G06N 20/00* (2019.01)

(56) References Cited

U.S. PATENT DOCUMENTS

| | | | |
|---|---|---|---|
| 8,589,811 | B2 | 11/2013 | Gotz |
| 8,983,994 | B2 | 3/2015 | Neels et al. |
| 9,335,911 | B1 | 5/2016 | Elliot et al. |
| 9,361,320 | B1 | 6/2016 | Vijendra et al. |
| 9,418,105 | B2 | 8/2016 | Buchheit et al. |
| 9,613,086 | B1 | 4/2017 | Sherman |
| 9,779,147 | B1 | 10/2017 | Sherman et al. |
| 10,001,898 | B1* | 6/2018 | Burtenshaw ............ G06F 16/26 |
| 10,460,332 | B1 | 10/2019 | Kujat et al. |
| 10,552,513 | B1 | 2/2020 | Harkare |
| 10,572,544 | B1 | 2/2020 | Zhang et al. |
| 10,572,804 | B1 | 2/2020 | Hilley |
| 10,572,859 | B1 | 2/2020 | Evans et al. |
| 10,572,925 | B1 | 2/2020 | Roy Chowdhury et al. |
| 10,592,525 | B1 | 3/2020 | Khante et al. |
| 10,642,723 | B1 | 5/2020 | Krishnarnoorthy |
| 10,705,695 | B1 | 7/2020 | Porath et al. |
| 10,719,332 | B1 | 7/2020 | Dwivedi et al. |
| 10,775,976 | B1 | 9/2020 | Abdul-Jal et al. |
| 10,929,415 | B1 | 2/2021 | Shcherbakov et al. |
| 10,963,347 | B1 | 3/2021 | Chen et al. |
| 11,074,301 | B2 | 7/2021 | Williams et al. |
| 11,232,506 | B1 | 1/2022 | Zielnicki |
| 2005/0134589 | A1 | 6/2005 | Meer et al. |
| 2007/0136285 | A1 | 6/2007 | Cormode et al. |
| 2007/0299708 | A1* | 12/2007 | Ouderkirk ............ G06Q 10/103 |
| | | | 705/301 |
| 2008/0168135 | A1 | 7/2008 | Redlich et al. |
| 2009/0105984 | A1 | 4/2009 | Wen et al. |
| 2011/0137850 | A1 | 6/2011 | Mourey et al. |
| 2011/0296309 | A1 | 12/2011 | Ngan |
| 2011/0302110 | A1 | 12/2011 | Beers et al. |
| 2011/0307819 | A1* | 12/2011 | Vadlamani ............ G06F 16/951 |
| | | | 707/706 |
| 2012/0229466 | A1 | 9/2012 | Richie et al. |
| 2012/0233182 | A1 | 9/2012 | Baudel et al. |
| 2013/0091465 | A1 | 4/2013 | Kikin-Gil et al. |
| 2013/0103677 | A1 | 4/2013 | Chakra et al. |
| 2013/0166543 | A1* | 6/2013 | MacDonald ........ G06F 16/9535 |
| | | | 707/E17.084 |
| 2013/0204894 | A1 | 8/2013 | Faith et al. |
| 2013/0300463 | A1 | 11/2013 | Gemmeke et al. |
| 2014/0019443 | A1 | 1/2014 | Golshan |
| 2014/0032548 | A1 | 1/2014 | Gilra et al. |
| 2014/0059017 | A1 | 2/2014 | Chaney et al. |
| 2014/0074889 | A1 | 3/2014 | Neels et al. |
| 2014/0156223 | A1 | 6/2014 | Toomre et al. |
| 2014/0344008 | A1 | 11/2014 | Garnrnage et al. |
| 2015/0112894 | A1 | 4/2015 | Lingappa |
| 2015/0278214 | A1 | 10/2015 | Anand et al. |
| 2016/0034305 | A1 | 2/2016 | Shear et al. |
| 2016/0092408 | A1 | 3/2016 | Lagerblad et al. |
| 2016/0092576 | A1 | 3/2016 | Quercia et al. |
| 2016/0103908 | A1 | 4/2016 | Fletcher et al. |
| 2016/0196534 | A1 | 7/2016 | Jarrett et al. |
| 2016/0307210 | A1 | 10/2016 | Agarwal et al. |
| 2016/0307233 | A1 | 10/2016 | Pan et al. |
| 2016/0350950 | A1 | 12/2016 | Ritchie et al. |
| 2016/0357829 | A1* | 12/2016 | Fung .................. G06Q 10/0639 |
| 2016/0364770 | A1 | 12/2016 | Denton et al. |
| 2017/0031449 | A1 | 2/2017 | Karsten et al. |
| 2017/0061659 | A1 | 3/2017 | Puri et al. |
| 2017/0069118 | A1 | 3/2017 | Stewart |
| 2017/0124617 | A1 | 5/2017 | Spoelstra et al. |
| 2017/0132489 | A1 | 5/2017 | Simgi |
| 2017/0140118 | A1 | 5/2017 | Haddad et al. |
| 2017/0154088 | A1 | 6/2017 | Sherman |
| 2017/0154089 | A1 | 6/2017 | Sherman |
| 2017/0220633 | A1 | 8/2017 | Porath et al. |
| 2017/0308913 | A1 | 10/2017 | Chao et al. |
| 2018/0004363 | A1 | 1/2018 | Tompkins |
| 2018/0032492 | A1 | 2/2018 | Altshuller et al. |
| 2018/0039399 | A1 | 2/2018 | Kaltegaertner et al. |
| 2018/0121035 | A1 | 5/2018 | Filippi et al. |
| 2018/0129369 | A1 | 5/2018 | Kim |
| 2018/0210936 | A1 | 7/2018 | Reynolds et al. |
| 2018/0232405 | A1 | 8/2018 | Samara et al. |
| 2018/0267676 | A1 | 9/2018 | Glueck et al. |
| 2018/0285772 | A1 | 10/2018 | Gopalan |
| 2018/0343321 | A1 | 11/2018 | Chang |
| 2019/0012553 | A1 | 1/2019 | Maruchi et al. |
| 2019/0026681 | A1 | 1/2019 | Polli et al. |
| 2019/0043506 | A1 | 2/2019 | Rivkin et al. |
| 2019/0102425 | A1* | 4/2019 | Obeidat ................ G06F 16/248 |
| 2019/0108272 | A1 | 4/2019 | Talbot et al. |
| 2019/0129964 | A1 | 5/2019 | Corbin, II et al. |
| 2019/0130512 | A1 | 5/2019 | Kuhn |
| 2019/0179621 | A1 | 6/2019 | Salgado et al. |
| 2019/0188333 | A1 | 6/2019 | Williams et al. |
| 2019/0213608 | A1 | 7/2019 | Ouyang et al. |
| 2019/0339688 | A1 | 11/2019 | Cella et al. |
| 2019/0355447 | A1 | 11/2019 | Barkoi et al. |
| 2020/0012939 | A1 | 1/2020 | Hu et al. |
| 2020/0019546 | A1 | 1/2020 | Luo et al. |
| 2020/0050636 | A1 | 2/2020 | Datla et al. |
| 2020/0066397 | A1 | 2/2020 | Rai et al. |
| 2020/0104731 | A1 | 4/2020 | Oliner et al. |
| 2020/0134545 | A1 | 4/2020 | Appel et al. |
| 2020/0175964 | A1* | 6/2020 | Eisenzopf ............... H04L 51/02 |
| 2020/0233559 | A1 | 7/2020 | Rueter et al. |
| 2020/0250472 | A1 | 8/2020 | Abhyankar et al. |
| 2020/0250562 | A1 | 8/2020 | Bly |
| 2020/0311680 | A1 | 10/2020 | Wahl et al. |
| 2020/0320462 | A1 | 10/2020 | Wang et al. |
| 2020/0333777 | A1 | 10/2020 | Maruyama |
| 2020/0372472 | A1 | 11/2020 | Kenthapadi et al. |
| 2020/0403944 | A1 | 12/2020 | Joshi et al. |
| 2020/0410001 | A1 | 12/2020 | Sarkissian |
| 2021/0011961 | A1 | 1/2021 | Guan et al. |
| 2021/0019338 | A1 | 1/2021 | Grampurohit et al. |
| 2021/0019357 | A1 | 1/2021 | Bennett et al. |
| 2021/0049143 | A1 | 2/2021 | Jacinto et al. |
| 2021/0081377 | A1 | 3/2021 | Polleri et al. |
| 2021/0088418 | A1 | 3/2021 | Sato et al. |
| 2021/0110288 | A1 | 4/2021 | Poothiyot et al. |
| 2021/0133632 | A1 | 5/2021 | Elprin et al. |
| 2021/0194783 | A1 | 6/2021 | Sinha et al. |
| 2021/0313070 | A1 | 10/2021 | Toyoshiba et al. |
| 2021/0365856 | A1 | 11/2021 | Mukherjee et al. |
| 2022/0019947 | A1 | 1/2022 | Mitelman |
| 2022/0124011 | A1* | 4/2022 | Vergé .................. H04L 41/5096 |
| 2022/0147540 | A1 | 5/2022 | Rossi et al. |
| 2022/0317979 | A1 | 10/2022 | Araujo Soares et al. |

FOREIGN PATENT DOCUMENTS

| | | |
|---|---|---|
| JP | 2009-534752 A | 9/2009 |
| JP | 2017174176 A | 9/2017 |
| JP | 2021-6991 A | 1/2021 |
| WO | WO2014010071 A1 | 1/2014 |
| WO | WO2015030214 A1 | 3/2015 |

OTHER PUBLICATIONS

Alpar, Paul et al., "Self-Service Business Intelligence," Business & Information Systems Engineering, 2016, vol. 58, pp. 151-155.
Amperser Labs, Proseiint: A linter for prose, htto://proselint.corni, Accessed: Feb. 10, 2020, pp. 1-3.
Anand, Anushka et al., Automatic Selection of Partitioning Variables for Small Mulitiple Dispiays, IEEE Transactions on Visualization and Computer Graphics, 2015, vol. 22, Iss, 1, pp. 669-677.

(56) References Cited

OTHER PUBLICATIONS

Anonymous, "Glitchart: When charts attack," https://glitch-chart. tumbir.com/, 2019, Accessed Feb. 5, 2020, pp. 1-1.

Arai, Taichi et ai., "Preventing the creation of misleading graphs, Targeted learning tool," IPSJ SIG Technical Report [online], Mar. 12, 2018, vol. 2018-GN-104 No. 4, ISSN 2188-8744, pp. 1-17.

Armstrong, Zan et al., "Visualizing Statistical Mix Effects and Simpson's Paradox," IEEE Transactions on Visualization and Computer Graphics, 2014, vol. 20, No. 12, pp. 2132-2141.

Barowy, Daniel W. et al., "CheckCell: Data Debugging for Spreadsheets," ACM SIGPLAN Notices, 2014, vol. 49, iss. 10, pp. 507-523.

Barovvy, Daniel W. et al., ExceLint: Automatically Finding Spreadsheet Formula Errors, n Proceedings of the ACM Programming Languages 2, OOPSLA, 2018, Article 148, pp. 1-26.

Barr, Earl T. et al., "The Oracle Problem in Software Testing: A Survey," IEEE Transactions on Software Engineering, 2015, vol. 41, No. 5, pp. 507-525.

Bergamaschi, Sonia et al., "A Semantic Approach to ETL Technologies," Data & Knowledge Engineering, 2011, pp. 1-24.

Binnig, Carsten et al., "Toward Sustainable Insights, or Why Polygamy is Bad for You," In Proceedings of the 8th Biennial Conference on Innovative Data Systems Research, 2017, pp. 1-7.

Borland, David et al., "Contextual Visualization," IEEE Computer Graphics and Applications, 2018 vol. 38, No. 6, pp. 17-23.

Boury-Brisset, Anne-Claire, "Ontology-based Approach for Information Fusion," Proceedings of the Sixth International Conference on Information Fusion, 2003, vol. 1, pp. 522-529.

Bresciani, Sabrina et al., "The Risks of Visualization," Identitat und Vielfalt der Kommunikations-wissenschaft, 2009, pp. 1-22.

Bresciani, Sabrina et al., "The Pitfalls of Visual Representations: A Review and Classification of Common Errors Made While Designing and Interpreting Visualizations," SAGE Open, 2015, pp. 1-14.

Buccella, Agustina et al., "Ontology-Based Data Integration Methods: A Framework for Comparison," Revista Colombiana de Cornputaci0n, 2005, vol. 6, No. 1, pp. 1-24.

Cairo, Alberto, "Graphic Lies, Misleading Visuals," in New Challenges for Data Design, Springer, 2015. pp. 103-116.

Chen, Xi et al., "Composition and Configuration Patterns in Multiple-View Visualizations," arXiv preprint, Aug. 2020, pp. 1-11.

Chi, Ed Huai-Hsin, "A Taxonomy of Visualization Techniques Using the Data State Reference Model," In IEEE Symposium on Information Visualizations, 2000, pp. 69-75.

Chiw, Charisee et al., "DATm: Diderot's Automated Testing Model," In IEEE/ACM 12th International Workshop on Automation of Software. Testing (AST), IEEE, 2017, pp. 45-51.

Cleveland, Williafvi S. et ai., "Variables on Scatterplots Look More Highly Correlated When the Scales are Increased," Science, 1982, vol. 216. No. 4550, pp. 1138-1141.

Cockburn, Andy et al., "I—lark No More: On the Preregistration of CHI Experiments," In Proceedings of the 2018 CHI Conference on Human Factors in Computing Systems, ACM, 2018, pp. 1-12.

Correll, Michael, "Ethical Dimensions of Visualization Research," In Proceedings of the 2019 CHI Conference on Human Factors In Computing Systems, ACM, 2019, pp. 1-13.

Correll, Michael et al., "Truncating the Y-Axis: Threat or Menace?," arXiv preprint arXiv:1907.02035, 2019, pp. 1-12.

Correll, Michael et al., "Surprise? Bayesian Weighting for De-Biasing Thematic Maps," IEEE Tranactions on Visualization and Computer Graphics, 2016, pp. 1-10.

Correll, Michael et al., "Black Hat Visualization," In IEEE VIS; Workshop on Dealing With Cognitive Biases in Visualizations, 2017, pp. 1-4.

Correll, Michael et al., "Looks Good To Me: Visualizations as Sanity Checks," IEEE Transactions on Visualizations and Computer Graphics, 2018, pp. 1-10.

Crisan, Anamaria et al., "GEViTRec: Data Reconnaissance Through Recommendation Using a Domain-Specific Visualization Prevalence Design Space," IEEE Transactions on Visualization and Computer Graphics, TVCG Submission, Jul. 2021, pp. 1-18.

Diehl, Alexandra et al., "VisGuides: A Forum for Discussing Visualization Guidelines," in Proceedings of the EurographicsliEEE VGTC Conference on Visualization: Short Papers, Eurographics Asscociation, 2018, pp. 61-85.

D'Ignazio, Catherine et al., "Feminist Data Visualization." In IEEE VIS: Workshop on Visualization for the Digital Humanities (ViS4DH), 2016, pp. 1-5.

D Mara, Evanthia et al., "A Task-Based Taxonomy of Cognitive Biases for Information Visualization," IEEE Transactions on Visualization and Computer Graphics, 2018, pp. 1-21.

Donaldson, Alastair F, et al., "Automated Testing of Graphics Shad&Compilers," In Proceedings of the ACM Programming Languages 1, OOFSLA, 2017, Article 93, pp. 1-29.

Dork, Marian et al., "Critical Info Vis: Exploring the Politics of Visualization." In 2013 ACM SIGCE-II Conference on Human Factors in Computing Systems, Extended Abstracts, 2013, pp. 2189-2198.

Dragicevic, Pierre et al., "increasing the Transparency of Research Papers with Exolorable Multiverse Analyses," In Proceedings of the ACM CHI Conference on Human Factors in Computing Systems, 2019, Glasgow, United Kingdom, pp. 1-16.

Eckerson, Vvayne W., "Performance Dashboards Measuring, Monitoring, and Managing Your Business," Business Book Summaries, 2012, pp. 1-11.

Efron, Bradley, "Bootstrap Methods: Another Look at the Jackknife," The Annals of Statistics, 1979, vol. 7, No., 1, pp. 1-26.

Elias, Mice-Ieline et al,, "Exploration Views: Understanding Dashboard Creation and Customization for Visualization Novices," Interact 2011, Part IV, LNCS 6949, 2011, pp. 274-291.

Filipov, Velitchko et al,, "CV3: Visual Exploration, Assessment, and Comparison of CVs," In Computer Graphics Forum, Wiley Online Library, 2019, pp. 107-118.

Ford, Brian, "Write-Good: Naive Linter for English Prose," https:figithub.comibtfordlwrite-good Accessed: Feb. 6, 2020, pp. 1-6.

Gelman, Andrew et al., "The garden of forking paths: Why multiple comparisons can be a problem, even when there is no "fishing expedition" or "p-hacking" and the research hypothesis was posited ahead of time," Department of Statistics, Columbia University, 2013, pp. 1-17.

Gotz, David et al., "Visualization Model Validation via Inline Replication," information Visualization, 2019, pp. 405-425.

Grocer, Christoph et al., "The Operational Process Dashboard for Manufacturing," SciVerse ScienceDirect, Procedia CIRP 7, 2013 pp. 205-210.

Guderlei, Ralph et al., "Statistical Metamorphic Testing—Testing Programs With Random Output by Means of Statistical Hypothesis Tests and Metaphoric Testing," In Seventh International Conference on Quality Software, IEEE, 2007, pp. 404-409.

Guo, Yue et al., What You See is Not What You Get !: Detecting Simpson's Paradoxes During Data Exploration, . ACM SIGMOD Workshop on Human-in-the-Loop Data Analytics (HILDA), 2017, Article 2, pp. 1-5.

Haraway, Donna, "Situated Knowledges: The Science Question in Feminism and the Priv lege of Partial Perspective," Feminist Studies, 1988, vol. 14, No. 3, pp. 575-599.

Heer, Jeffrey, "Agency plus automation: Designing artificial intelligence into interactive systems," in Proceedings of the National Academy of Sciences, 2019, vol. 118, No. 6, pp. 1844-1850.

Heer, Jeffrey, "Visualization is Not Enough," https://homes. csmashington.edu/HheerltalksiEuro Vis2019- Capstone.pdf EuroVis Capstone, 2019. pp. 1-113.

Heer, Jeffrey et al., "Multi-Scale Banking to 45 Degrees," IEEE Transactions on Visualization and Computer Graphics, 2006, vol. 12, No. 5, pp. 701-708.

Hibbard, William L. et ai., "A Lattice Model for Data Display," In Proceedings of the Conference on Visualization, IEEE Computer Society Press, 1994, pp. 310-317.

Hoang, Duong Thi Anh et al., "Dashboard by-Example: A Hypergraph-based Approach to On-demand Data warehousing systems," IEEE International Conference on Systems, Man, and Cybernetics, 2012, pp. 1853-1858.

(56)　　　　　References Cited

OTHER PUBLICATIONS

Hofmann, Heike et al., "Graphical Tests for Power Comparison of Competing Designs," IEEE Transactions on Visualization and Computer Graphics, 2012, vol. 18, No. 12, pp. 2441-2448.

Huff, Darrell, "How To Lie With Statistics," VON Norton & Company, 31st Printing, 1993, pp. 1-141.

Hullman, Jessica et al., "Visualization Rhetoric: Framing Effects in Narrative Visualization," IEEE Transaction on Visualization and Computer Graphics, 2011, vol. 17, No. 12, pp. 2231-2240.

Hynes, Nick et al., "The Data Linter: Lightweight, Automated Sanity Checking for ML Data Sets," In NIPS: Workshop on Systems for ML and Open Source Software, 2017, pp. 1-7.

International Search Report and Written Opinion for International Patent Application No. PCTIUS2020/038157 mailed Oct. 6, 2020, pp. 1-8.

International Search Report and Written Opinion for International Patent Application No. PCT/US2020/057780 mailed Feb. 2, 2021, pp. 1-8.

International Search Report and Written Opinion for International Patent Application No. PCT/US2020/050722 mailed Nov. 24, 2020, pp. 1-6.

International Search Report and Written Opinion for International Patent Application No. PCT/US2021/043167 mailed Oct. 26, 2021, pp. 1-7.

International Search Report and Written Opinion for International Patent Application No. PCT/US2021/043177 mailed Oct. 26, 2021, pp. 1-8.

International Search Report and Written Opinion for International Patent Application No. PCT/US2021/049229 mailed Nov. 16, 2021, pp. 1-8.

International Search Report and Written Opinion for International Patent Application No. PCT/US2022/012907 mailed 16, 2022, pp. 1-13.

Isenberg, Tobias et al., A Systematic Review on the Practice of Evaluating Visualization ,° IEEE Transactions on Visualization and Computer Graphics, 2013, vol. 19, No. 12, pp. 2818-2827.

Jannah, Hassan M., "MetaReader: A Dataset Meta-Exploration and Documentation Tool," 2014, pp. 1-11.

Johnson, Stephen C., "Lint, a C Program Checker," Citeseer, 1977, pp. 1-12.

Kandel, Sean et al., "Research directions in data wrangling: Visualizations and transformations for usable and credible data," Information Visualization, 2011, vol. 10, No. 4, pp. 271-288.

Kandel, Sean et al., "Profiler: Integrated Statistical Analysis and Visualization for Data Quality Assessment," In Proceedings of the international Working Conference on Advanced Visual Interfaces, ACM, 2012, pp. 547-554.

Kaur, Pawandeep et al., "A Review on Visualization Recommendation Strategies," in Proceedings of the 12th International Joint Conference on Computer Vision. Imaging and Computer Graphics Theory and Applications. 2017, vol. 3, pp. 266-273.

Key, Alicia et al., "VizDeck: Self-Organizing Dashboards for Visual Analytics," SIGMOD International Conference on Management of Data, 2012, pp. 681-684.

Kim, Won et al., "A Taxonomy of Dirty Data," Data Mining and Knowledge Discovery, 2003, vol. 7, No. 1, pp. 81-89.

Kindlmann, Gordon et al., "An Algebraic Process for Visualization Design," IEEE Transactions on Visualization and Computer Graphics, 2014, vol. 20, No. 12, pp. 2181-2190.

Kindlmann, Gordon et al., "Algebraic Visualization Design for Pedagogy," IEEE VIS: Workshop on Pedagogy of Data Visualization, 2016, pp. 1-5.

Kintz, Maximilien, "A Semantic Dashboard Description Language for a Process-oriented Dashboard Design Methodology," 2nd International Workshop on Mode-based Interactive Ubiquitous Systems, 2012, pp. 1-6.

Kirby, Robert M. et al., "The Need for Verifiable Visualization," IEEE Computer Graphics and Applications, 2008, vol. 28, No. 5, pp. 78-83.

Kong, Ha-Kyung et al., "Frames and Slants in Titles of Visualizations on Controversial Topics," In Proceedings of the 2018 CHI Conference on Human Factors in Computing Systems, ACM, 2018, pp. 1-12.

Kong, Ha-Kyung et al., "Trust and Recall of Information across Varying Degrees of Title—Visualization Misalignment," In Proceedings of the 2019 CHI Conference on Human Factors In Computing Systems, ACM, 2019, 346, pp. 1-13.

Lavigne, Sam et al., "Predicting Financial Crime: Augmenting the Predictive Policing Arsenal," arXiv preprint arXiv:1704.07826, 2017, pp. 1-8.

Lennerholt, Christian et al., "Implementation Challenges of Self Service Business Intelligence: A Literature Review," Proceedings of the 51st Hawaii International Conference on System Sciences, 2018, pp. 5055-5063.

Lizotte-Latendresse, Si ON et al., "implementing self-service business analytic's supporting lean manufacturing: A state-of-the-art review," 16th IFAC Symposium-Incom, 2018, pp. 1143-1148.

Lundgard, Alan et al., "Sociotechnicai Considerations for Accessible Visualization Design," IEEE Transactions on Visualization and Computer Graphics, 2019, pp. 1-5.

Lunzer, Aran et al., "It Ain't Necessarily So: Checking Charts for Robustness," IEEE VisWeek Poster Proceedings, 2014, pp. 1-3.

Lupi, Giorgia, "'Data Humanism: The Revolutionary Future of Data Visualization," Print Magazine 30, 2017, pp. 1-10.

Mackinlay, Jock, "Automating the Design of Graphical Presentations of Relational Information," ACM Transactions on Graphics, 1986, vol. 5, No. 2, pp. 110-141.

Mackinlay, Jock et al., "Show Me: Automatic Presentation for Visual Analysis," IEEE Transactions on Visualization and Computer Graphics, 2007, vol. 13, No. 6, pp. 1137-1144.

Matejka, Justin et al,, "Same Stats, Different Graphs: Generating Datasets with Varied Appearance and Identical Statistics Through Simulated Annealing," In Proceedings of the 2017 CHI Conference on Human Factors in Computing Systems, ACM, 2017, pp. 1290-1294.

Matera, Maristella et al., "PEUDOM: A Mashup Platform for the End User Development of Common Information Spaces," iCVVE 2013, LNCS 7977, 2013, pp. 494-497.

Mayorga, Adrian et al., "Spiatterplots: Overcoming Overdraw in Scatter Plots," IEEE Transactions on Visualization and Computer Graphics, 2013, vol. 19, No., 9, pp. 1526-1538.

Mayr, Eva et al., "Trust in Information Visualization," In EuroVis Workshop on Trustworthy Visualization (TrustVis), Robert Kosara, Kai Lawonn, Lars Linsenm, and Noeska Smit (Eds.), The Eurographics Association, 2019, pp. 1-5.

Mazumdar, Suvodeep et al., "A Knowledge Dashboard for Manufacturing industries," ESWC 2011 Workshops, LNCS 7117, 2012, pp. 112-124.

McNutt, Andrew et al., "Linting for Visualization: Towards a Practical Automated Visualization Guidance System," In VisGuides: 2nd Workshop on the Creation, Curation, Critique. and Conditioning of Principles and Guidelines in Visualization, 2018, pp. 1-14.

Micallef, Luana et al., "Towards Perceptual Optimization of the Visual Design of Scatterplots," IEEE Transactions on Visualization and Computer Graphics, 2017, vol. 23, No. 6, pp. 1-12.

Moere, Andrew Vande, "Towards Designing Persuasive Ambient Visualization," In Issues in the Design & Evaluation of Ambient information Systems Workshop, Citeseer, 2007, pp. 48-52.

Moritz, Dominik et al, "Formalizing Visualization Design Knowledge as Constraints: Actionable and Extensible Models in Draco," IEEE Transactions on Visualization and Computer Graphics, 2018, vol. 25, No. 1, pp. 438-448.

Muslu, Kivanc et al., "Preventing Data Errors with Continuous Testing," in Proceedings of the 2015 International Symposium on Software Testing and Analysis, ACM, 2015, pp. 373-384.

Negasi-1, Solomon, "Business intelligence," Communications of the Association for Information Systems, 2004, vol. 13, pp. 177-195.

Newman, George E. et al., "Bar graphs depicting averages are perceptually misinterpreted: The within-the-bar bias," Psychonomic Bulletin & Review, 2012, vol. 19, No. 4, pp. 601-607.

(56)           References Cited

OTHER PUBLICATIONS

Office Communication for U.S. Appl. No. 16/368,390 mailed Mar. 2, 2020, pp. 1-8.
Office Communication for U.S. Appl. No. 17/014,882 mailed Apr. 27, 2021, pp. 1-27.
Office Communication for U.S. Appl. No. 16/732.027 mailed Jun. 14, 2021, pp. 1-22.
Office Communication for U.S. Appl. No. 16/915,963 mailed Jul. 19, 2021, pp. 1-9.
Office Communication for U.S. Appl. No. 16/903,967 mailed Sep. 27, 2021, pp. 1-16.
Office Communication for U.S. Appl. No. 17/014,882 mailed Nov. 2, 2021, pp. 1-33.
Office Communication for U.S. Appl. No. 16/732,027 mailed Nov. 15, 2021, pp. 1-25.
Office Communication for U.S. Appl. No. 16/944,064 mailed Nov. 26. 2021, pp. 1-50.
Office Communication for U.S. Appl. No. 16/672,130 mailed Jan. 5, 2022, pp. 1-32.
Office Communication for U.S. Appl. No. 16/915,963 mailed Jan. 7, 2022, pp. 1-9.
Office Communication for U.S. Appl. No. 17/014,882 maiied Jan. 25, 2022, pp. 1-6.
Office Communication for U.S. Appl. No. 16/732,027 mailed Feb. 25, 2022, pp. 1-6.
Office Communication for U.S. Appl. No. 16/944,085 mailed Mar. 17, 2022, pp. 1-6.
Office Communication for U.S. Appl. No. 16/903,967 mailed Mar. 18, 2022, pp. 1-11.
Office Communication for U.S. Appl. No. 16/915,963 mailed Mar. 23, 2022, pp. 1-4.
Office Communication for U.S. Appl. No. 16/915,963 mailed Apr. 26, 2022, pp. 1-9.
Office Communication for U.S. Appl. No. 16/672,130 mailed May 19, 2022, pp. 1-33.
Office Communication for U.S. Appl. No. 17/014,882 mailed Jun. 9, 2022, pp. 1-8.
Office Communication for U.S. Appl. No. 16/732,027 mailed Jun. 14, 2022, pp. 1-18.
Office Communication for U.S. Appl. No. 16/672,130 mailed Aug. 2, 2022, pp. 1-5.
Office Communication for U.S. Appl. No. 16/944,085 mailed Aug. 30, 2022, pp. 1-9.
Office Communication for U.S. Appl. No. 16/944,085 mailed Sep. 9, 2022, pp. 1-2.
Office Communication for U.S. Appl. No. 16/672,130 mailed Sep. 13, 2022, pp. 1-35.
Office Communication for U.S. Appl. No. 17/014,882 mailed Sep. 28, 2022, pp. 1-11.
Office Communication for U.S. Appl. No. 16/915,963 mailed Oct. 5, 2022, pp. 1-7.
Office Communication for U.S. Appl. No. 16/732,027 mailed Oct. 28, 2022, pp. 1-11.
Office Communication for U.S. Appl. No. 16/732,027 mailed Jan. 17, 2023, pp. 1-5.
Office Communication for U.S. Appl. No. 16/672,130 mailed Feb. 13, 2023, pp. 1-34.
Office Communication for U.S. Appl. No. 17/866,091 mailed Mar. 2, 2023, pp. 1-30.
Office Communication for U.S. Appl. No. 16/732,027 mailed Mar. 8, 2023, pp. 1-9.
Office Communication for U.S. Appl. No. 17/588,145 mailed Apr. 26, 2023, pp. 1-16.
Office Communication for U.S. Appl. No. 16/672,130 mailed May 19, 2023, pp. 1-5.
Office Communication for U.S. Appl. No. 17/344,633 mailed Jun. 27, 2023, pp. 1-43.
Office Communication for U.S. Appl. No. 16/672,130 mailed Jul. 3, 2023, pp. 1-39.

Onuoha, Mimi, "On Missing Data Sets," https://github.cornirni ,nuohairnissing-datasets, Accessed: Feb. 10, 2020, pp. 1-3.
Palpanas, Themis et al., "Integrated model-driven dashboard development," Information Systems Frontiers, 2007, vol. 9. pp. 1-14.
Pandey, Anshul Vikram et al., "How Deceptive are Deceptive Visualizations?: An Empirical Analysis of Common Distortion Techniques," In Proceedings of the 33rd Annual ACM Conference on Human Factors in Ciomputing Systems, ACM, 2015, pp. 1469-1478.
Park, Laurence A. F, et al., "A Blended Metric for Multi-label Optimisation and Evaluation," ECML/PKDD, 2018, pp. 1-16.
Plaisant, Catherine, "Information Visualization and the Challenge of Universal Usability," In Exploring Geovisualization, Elsevier, 2005, pp. 1-19.
Passlick, Jens et al., "A Self-Service Supporting Business Intelligence and Big Data Analytics Architecture," Proceedings of the 13th International Conference on Wirtschaftsnformatik, 2017, pp. 1126-1140.
Pirolli, Peter et al., "The Sensemaking Process and Leverage Points for Analyst Technology as Identified Through Cognitive Task Analysis," In Proceedings of International Conference on Intelligence Analysis, 2005, vol. 5, pp. 1-6.
Pu, Xiaoying et al., "The Garden of Forking Paths in Visualization: A Design Space for Reliable Exploratory Visual Analyics: Position Paper," In IEEE VIS: Evaluation and Beyond-Methodological Approaches for Visualization (BELIV), IEEE, 2018, pp. 37-45.
Qu, Zening et al., "Keeping Multiple Views Consistent: Constraints, Validations, and Exceptions in Visualization Authoring," IEEE Transactions on Visualization and Computer Graphics, 2017, vol. 24, No. 1, pp. 468-477.
Raman, Vijayshankar et al., "Potter's Wheel: An interactive Data Cleaning System," In Proceedings of the 27th International Conference on Very Large Data Bases, 2001, vol. 1, pp. 381-390.
Redmond, Stephen, "Visual Cues in Estimation of Part-To-Whole Comparisons," IEEE Transactions on Visualization and Computer Graphics, 2019, pp. 1-6.
Resnick, Marc L., "Building the Executive Dashboard," Proceedings of the Human Factors and Ergonomics Society 47th Annual Meeting, 2003, pp. 1639-1643.
Ritchie, Jacob et al., "A Lie Reveals the Truth: Quasimodes for Task-Aligned Data Presentation," In Proceedings of the 2019 CHI Conference on human Factors in Computing Systems, ACM, 193, 2019, pp. 1-13.
Roberts, Jonathan C., "State of the Art: Coordinated & Multiple Views in Exploratory Visualization," Proceedings of the 5th International Conference on Coordinated & Multiple Views in Exploratory Visualization, IEEE Computer Society Press, 2007, pp. 61-71.
Rogowitz, Bernice E. et al., "The "Which Blair Project". A Quick Visual Method for Evaluating Perceptual Color Maps," In IEEE Visualization 2001, Proceedings, 2001, pp. 183-190.
Rogowitz, Bernice E. et al., "How Not to Lie with Visualization," Computers in Physics, 1996, vol. 10, No. 3, pp. 268-273.
Rosling, Hans et al., "Health advocacy with Gaprninder animated statistics," Journal of Epidemiology and Global Health, 2011, vol. 1, No. 1, pp. 11-14.
Sacha, Dominik et al., "The Role of Uncertainty, Awareness, and Trust in Visual Analytics," IEEE Transactions on Visualization and Computer Graphics, 2016, vol. 22, No. 1, pp. 240-249.
Salimi,Babak et al., "Bias in OLAP Queries Detection, Explanation, and Removal," In Proceedings of the 2018 International Conference on Management of Data, ACM, 2018, pp. 1021-1035.
Sarikaya, Alper et al., "What Do We Talk About When We Talk About Dashboards?," IEEE Transactions on Visualization and Computer Graphics, 2018, pp. 1-11.
Segura, Sergio et al., "A Survey on Metamorphic Testing," IEEE Transactions on Software Engineering, 2016, vol. 42, No. 9, pp. 805-824.
Shi, Danqing et al., "Talk2Data: High-Level Question Decomposition for Data-Oriented Question and Answering," preprint, arXiv:2107. 14420, Jul. 2021, pp. 1-11.
Shneiderman, Ben, "The Eyes Have it: A Task by Data Type Taxonomy for Information Visualizations," Proc. Visual Languages, 1996, pp. 1-9.

(56) References Cited

OTHER PUBLICATIONS

Song, Hayeong et al., "Where's My Data? Evaluating Visualizations with Missing Data," IEEE Transactions on Visualization and Computer Graphics, 2018, vol. 25, No. 1, pp. 914-924.

Srinivasan, Arjun et al., "Augl-nenting Visualizations with Interactive Data Facts to Facilitate interpretation and Communication," IEEE Transactions on Visualization and Computer Graphics, 2018, vol. 25, No. 1. pp. 672-681.

Stonebraker, Michael et al., "Data Curation at Scale: The Data Tamer System," In Proceedings of the 6th Biennial Conference on Innovative Data Systems Research, 2013, pp. 1-10.

Szafir, Danielle Albers, "The Good, the Bad, and the Biased: Five Ways Visualizations Can Mislead (and How to Fix Them)," ACM Interactions, 2018, vol. 25, No. 4, pp. 26-33.

Tang, Nan et al., "Towards Democratizing Relational Data Visualization," In Proceedings of the 2019 International Conference on Management of Data, ACM, 2019, pp. 2025-2030.

Tableau, "Tableau Prep," ps://www.tableau.com.products/orepl, 2020, pp. 1-13.

Theorin, Alfred et al., "An Event-Driven Manufacturing Information System Architecture," IFAC/IEEE Symposium on Information Control Problems in Manufacturing, 2015, pp. 1-9.

Touma, Rizkallah et al., "Supporting Data integration Tasks with Semi-Automatic Ontology Construction," DOLAP '15: Proceedings of the ACM Eighteenth International Workshop on Data Warehousing and OLAP, 2015, pp. 89-98.

Trifacta, "Trifacta," https://www.trifacta.comf, 2020, pp. 1-8.

Trulia, "New York Real Estate Market Overview," https://www.tru..a.cornireaLestateiNewyork-NewYork/, 2020, Accessed: Feb. 11, 2020, pp. 1-3.

Valdez, Andre Calero et al., "A Framework for Studying Biases in Visualization Research," 2017, pp. 1-5.

Van Vvijk, Jarke J., "The Value of Visualization," In VIS 05, IEEE Visualization, 2005, IEEE, pp. 79-86.

Vanderplas, Jacob et al., "Altair: Interactive Statistical Visualizations for Python," The Journal of Open Source Software, 2018, vol. 3, No. 32, pp. 1-2.

Veras, Rafael et al., "Discrirninability Tests for Visualization Effectiveness and Scalability," IEEE Transactions on Visualization and Computer Graphics, 2019, pp. 1-10.

Vickers, Paul et al., "Understanding Visualization: A Formal Foundation using Category Theory and Semiotics," IEEE Transactions on Visualization and Computer Graphics, 2012, vol. 19, No. 6, pp. 1-14.

Wainer, Howard, "How to Display Data Badly." The American Statistician, 1984, vol. 38, No. 2, pp. 137-147.

Wall, Emily et ai., "Warning, Bias May Occur: A Proposed Approach to Detecting Cognitive Bias in Interactive Visual Analytics," In 2017 IEEE Conference on Visual Analytics Science and Technology (VAST), IEEE, 2017, pp. 104-115.

Wang, Pei et al., "Uni-Detect: A Unified Approach to Automated Error Detection in Tables," In Proceedings of the 2019 International Conference on Management of Data, ACM, 2019, pp. 811-828.

Wang Baldonado, Michelle Q. et al., "Guidelines for Using Multiple Views in Information Visualization," AVI '00, Proceedings of the Working Conference on Advanced Visual Interfaces, May 2000, pp. 1-10.

Wang, Yun et al., "DataShot: Automatic Generation of Fact Sheets from Tabular Data," IEEE Transactions on and Computer Graphics, vol. 26, No. 1, Aug. 2019, pp. 1-11.

Wickham, Hadley et al., "Graphical Inference for Infovis," IEEE Transactions on Visualization and Computer Graphics 16, 2010, pp. 973-979.

Whitworth, Brian, "Polite Computing," Behaviour & Information Technology, 2005, vol. 24, No. 5, pp. 353-363.

Wood, Jo et al., "Design Exposition with Literate Visualization," IEEE Transactions on Visualization and Computer Graphics, 2013, vol. 25, No. 1, pp. 759-768.

Wong, Office Action, U.S. Appl. No. 17/158,911, Jun. 28, 2022, 29 pgs.

Wong, Final Office Action, U.S. Appl. No. 17/158,911, Dec. 23, 2022, 37 pgs.

Wong, Advisory Action, U.S. Appl. No. 17/158,911, Mar. 8, 2023, 4 pgs.

Wong, Office Action, U.S. Appl. No. 17/158,911, Apr. 27, 2023, 40 pgs.

Wong, Notice of Allowance, U.S. Appl. No. 17/158,911, Oct. 2, 2023, 10 pgs.

World Bank Group, "World Development Indicators," http://datatopics.worldbank,orgiworld-development-indicators/, 2020, pp. 1-6.

Wu, Eugene et al., "Scorpion: Explaining Away Outliers in Aggregate Queries," Proceedings of the VLDB Endowment, 2013, vol. 6, No. 8, pp. 553-564.

W U, Aoyu et al., "MultiVision: Designing Analytical Dashboards with Deep Learning Based Recommendation," IEEE, preprint, arXiv:2107.07823, Jul. 2021, pp. 1-11.

Xiong, Cindy et al., "Illusion of Causality in Visualized Data," arXiv preprint arXiv:1908.00215, 2019, pp. 1-10.

Xiong, Cindy et al., "The Curse of Knowledge in Visual Data Communication," IEEE Tran ctions on Visualization and Computer Graphics, 2019, pp. 1-12.

Yigitbasioglu, Ogan Ni et al., "A review of dashboards in performance management: Implications for design and research," International Journal of Accounting information Systems, 2012, vol. 13, pp. 41-59.

Zgraggen, Emanuel et al., Investigating the Effect of the Multiple Comparisons Problem in Visual Analysis, Proceedings of the 2018 CHI Conference on Human Factors in Computing Systems, ACM, 2018, pp. 1-12.

Zhang, Shuo et al., "Ad Hoc Tabie Retrieval using Semantic Similarity," IIN3C2, Creative Commons CC BY 4.0 License, 2018, pp. 1553-1562.

Zhao, Zheguang et al., "Controlling False Discoveries During Interactive Data Exploration," In proceedings of the 2017 International Conference on Management of Data, ACM, 2016, pp. 527-540.

Zhou, Zhi Quan et al., "Metamorphic Testing of Driverless Cars," Communications of the ACM, 2019, vol. 62. No. 3, pp. 61-67.

Zieivikiewicz, Caroline et al., "Embedding Information Visualization Within Visual Representation," In Advances in Information and Intelligent Systems, Springer, 2009, pp. 1-20.

* cited by examiner

*103*

*104*

*100*

Mobile Computer

Laptop Computer

*105*

*102*

*108*

Tablet Computer

WIRELESS
NETWORK

Client
Computer

WIDE AREA
NETWORK/
LOCAL AREA
NETWORK –
(NETWORK)

*110*

*118*

Data Source(s) Server
Computer(s)

*116*

Visualization Server
Computer

502

500

Data Tables

| |
|---|
| views |
| workbooks |
| annotations |
| users |
| ... |

504

| Field Name | Type |
|---|---|
| ID | Reference |
| caption | String |
| create_date | Timestamp |
| datasource_ID | Reference |
| title | String |
| fields | String(s) |
| customer_ID | Reference |
| platform_version | Number |
| ... | ... |

506

| ID | caption | create_date | DS ID | ... |
|---|---|---|---|---|
| 101 | "..." | 11/11/2020 | 5 | ... |
| 102 | "..." | 10/1/2019 | 5 | ... |
| 110 | "..." | 10/3/2019 | 3 | ... |
| ... | ... | ... | ... | ... |

*Figure 5*

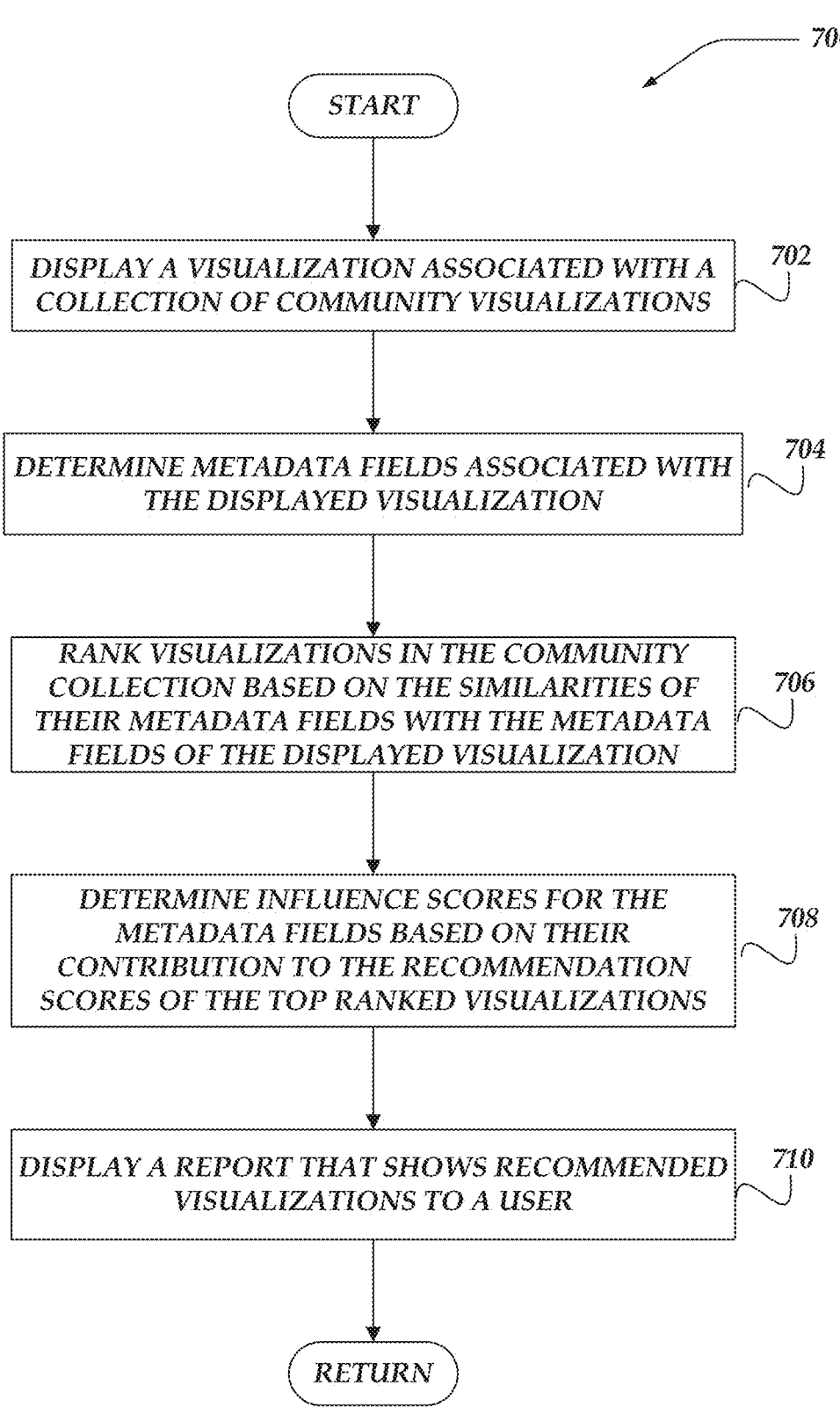

*700*

START

DISPLAY A VISUALIZATION ASSOCIATED WITH A COLLECTION OF COMMUNITY VISUALIZATIONS    *702*

DETERMINE METADATA FIELDS ASSOCIATED WITH THE DISPLAYED VISUALIZATION    *704*

RANK VISUALIZATIONS IN THE COMMUNITY COLLECTION BASED ON THE SIMILARITIES OF THEIR METADATA FIELDS WITH THE METADATA FIELDS OF THE DISPLAYED VISUALIZATION    *706*

DETERMINE INFLUENCE SCORES FOR THE METADATA FIELDS BASED ON THEIR CONTRIBUTION TO THE RECOMMENDATION SCORES OF THE TOP RANKED VISUALIZATIONS    *708*

DISPLAY A REPORT THAT SHOWS RECOMMENDED VISUALIZATIONS TO A USER    *710*

RETURN

*Figure 7*

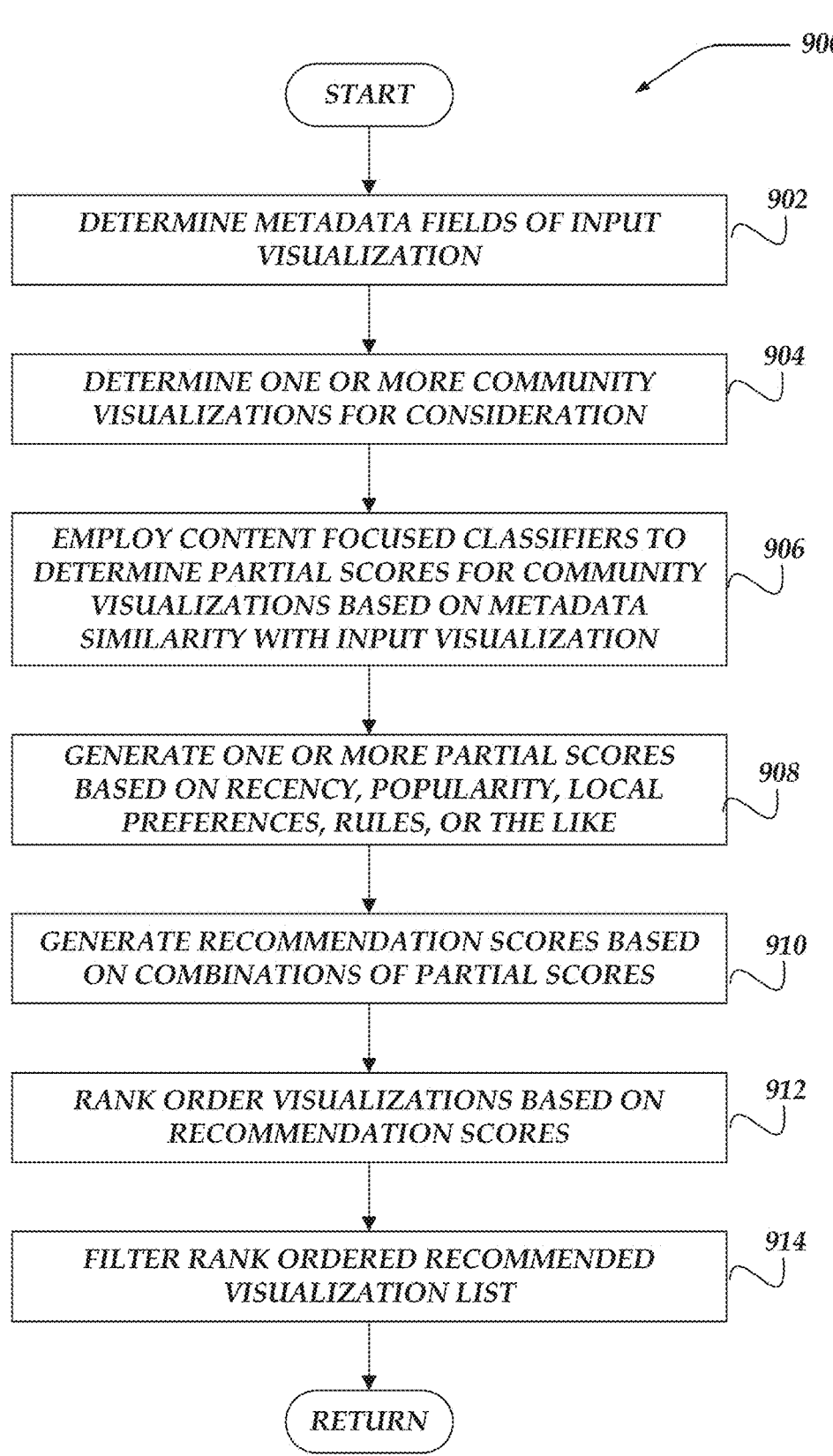

*900*

START

DETERMINE METADATA FIELDS OF INPUT VISUALIZATION — *902*

DETERMINE ONE OR MORE COMMUNITY VISUALIZATIONS FOR CONSIDERATION — *904*

EMPLOY CONTENT FOCUSED CLASSIFIERS TO DETERMINE PARTIAL SCORES FOR COMMUNITY VISUALIZATIONS BASED ON METADATA SIMILARITY WITH INPUT VISUALIZATION — *906*

GENERATE ONE OR MORE PARTIAL SCORES BASED ON RECENCY, POPULARITY, LOCAL PREFERENCES, RULES, OR THE LIKE — *908*

GENERATE RECOMMENDATION SCORES BASED ON COMBINATIONS OF PARTIAL SCORES — *910*

RANK ORDER VISUALIZATIONS BASED ON RECOMMENDATION SCORES — *912*

FILTER RANK ORDERED RECOMMENDED VISUALIZATION LIST — *914*

RETURN

*Figure 9*

CONTENT BASED RELATED VIEW RECOMMENDATIONS

CROSS-REFERENCE TO RELATED APPLICATIONS

This application is a continuation of U.S. patent application Ser. No. 17/158,911, filed Jan. 26, 2021, titled "Content Based Related View Recommendations," which is incorporated by reference in its entirety.

TECHNICAL FIELD

The present application relates generally to data visualization, and more particularly, but not exclusively to, recommendation of visualizations for users.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data may enable organizations to improve their understanding of critical business operations and help them monitor key performance indicators. However, in some cases, organizations may have many visualizations that may be used for a variety of purposes. In some cases, selecting the appropriate visualizations for a given analysis may be challenging for non-authoring users who may be unfamiliar with the motivations or assumptions of the author who created the visualization. Likewise, in some cases, organizations may have many useful or popular visualizations that users may be unaware of. Thus, is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings.

FIG. 5 is a logical schematic of a portion of a system showing some metadata for content based related view recommendations in accordance with one or more of the various embodiments.

FIG. 7 is an overview flowchart for a process for content based related view recommendations in accordance with one or more of the various embodiments.

FIG. 9 is a flowchart for a process for content based related view recommendations in accordance with one or more of the various embodiments.

DETAILED DESCRIPTION OF VARIOUS EMBODIMENTS

Figure 1:
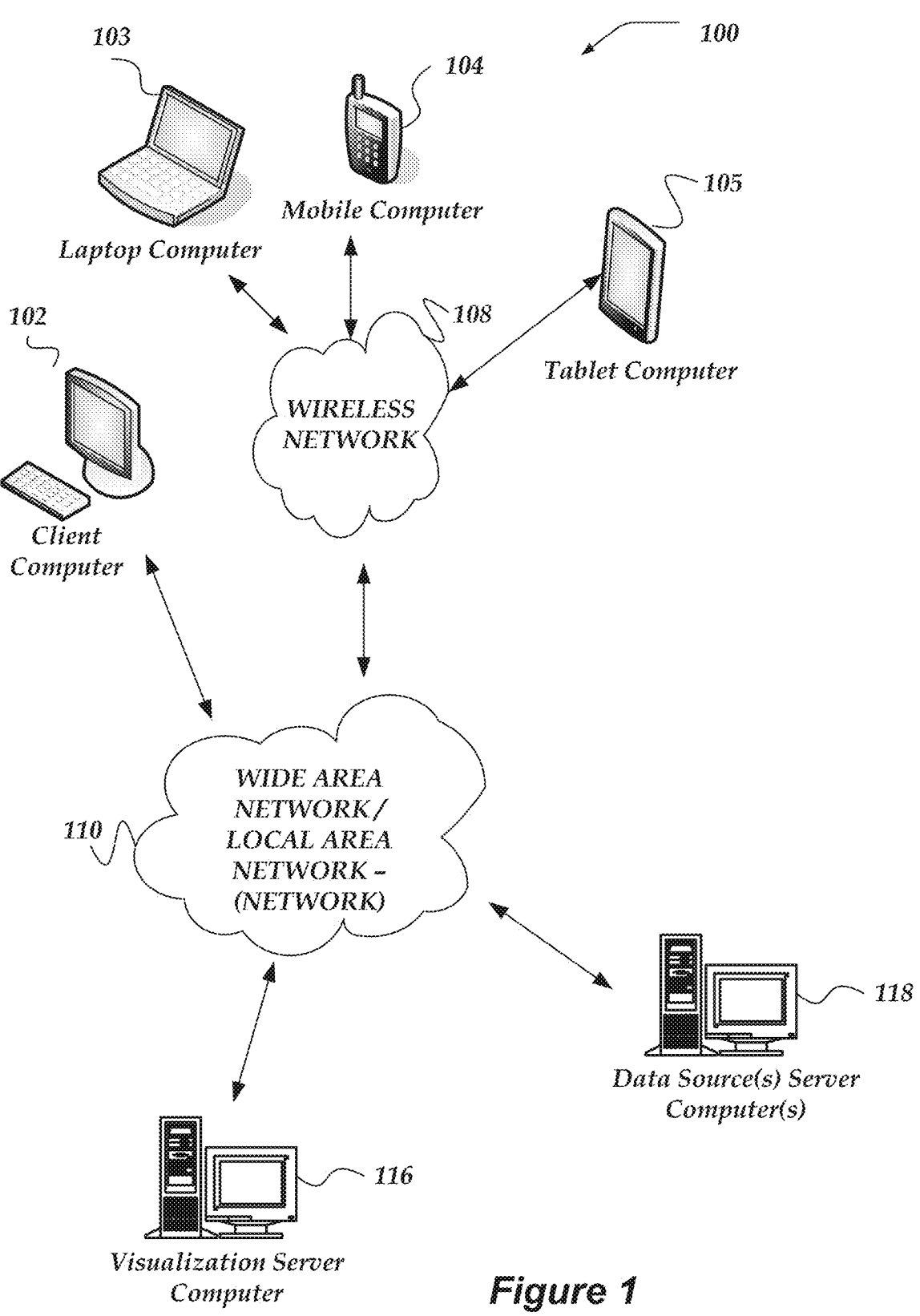
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the innovations herein may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one or more of the various embodiments," "in some embodiments," "for some embodiments," "in one embodiment" as used herein do not necessarily refer to the same embodiments, though they may. Furthermore, the phrases "in one or more of the various embodiments," "in some embodiments," "for some embodiments," "in one embodiment" as used herein do not necessarily refer to different embodiments, although they may. Thus, as described below, various embodiments may be readily combined, without departing from the scope or spirit of the innovations described herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As user herein the "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "display object" refers to one or more data structures that comprise visualization models. In some cases, display objects may be considered portions of the visualization model. Display objects may represent individual instances of items or entire classes or kinds of items that may be displayed in a visualization. In some embodiments, display objects may be considered or referred to as views because they provide a view of some portion of the data model.

As used herein the term "recommendation model" refers to one or more data structures that include machine learning based models that may be arranged to predict visualizations for users. In some cases, there may be different types of recommendation models that may be based on different types of machine learning. Likewise, in some embodiments, different recommendation models may be arranged for recommending visualizations based on different criteria or for different purposes. In some cases, recommendation models may include one or more heuristics, filters, or the like, that work in conjunction with one or more machine learning sub-models.

As used herein the term "baseline model" refers to a recommendation model that has been trained or tuned based on training data associated with public or common usage history of a general population a users rather than users associated with the organization. Baseline models may be used to bootstrap initial recommendation models that may be used until sufficient training data is collected to train personalized models for users in an individual organization.

As used herein the term "user profile" refers to a data structure that includes information or data that is based on or associated with one or more characteristics of an individual user. For example, user profiles may include information that represents information, such as, user identity, group membership, role, access rights, previous activity, preferred visualizations, user preferences, or the like. In some cases, user profiles may include references or pointers to additional information including historical activity logs, telemetry information, or the like. In some embodiments, some or all values included in user profiles may be normalized, weighted, curved, shaped, or the like, to enable modeling engines to train recommendation models or for use by recommendation engines to recommend visualizations based on user profiles.

As used herein the terms "visualization metadata," "metadata fields," or "metadata" refer to values provided from fields associated with visualizations that may describe various characteristics of a visualization or associated with a visualization that may be separate or distinguishable from the visualization as viewed by users or authors. Meta-data may be important for describing one or more characteristics of the visualization but they are not an authored portion of the visualization. Though, in some cases, information displayed in a visualization may include information derived from meta-data. However, meta-data may be associated with visualization whether it is displayed or otherwise visible in a visualization. Meta-data comes in many forms and several examples are discussed herein. A few examples of meta-data may include, author name, table names (from data sources), column names (from data source tables), or the like.

As used herein the term "community visualization" refers to one or more visualizations that may be associated with an organization or other larger public community. Community visualizations may be considered other visualizations that a user has permission to access or view. In some cases, some community visualizations may be visualizations generated by the same or other users in the organization. In other cases, one or more community visualizations may be arranged to visualization that may be in the public domain or otherwise accessible to the public. For clarity and brevity, the different categories of community visualizations are simply referred to as community visualizations unless the context clearly indicates otherwise. Recommended visualizations may be provided from among community visualizations.

As used herein the term "recommendation score" refers a score, metric, or measurement associated with a visualization that indicates a quality of the recommendation as per the criteria of the recommendation model providing the score. In most case, a recommendation score may be a combination of one or more partial scores that may be combined into one value.

As used herein the term "influence score" refers to a score, metric, or measurement associated with individual metadata fields associated with a recommended visualization. The influence score represent how much the individual metadata fields contributed to the recommendation score of a recommended visualization. Influence scores help answer the question of why a particular visualization is recommended.

As used the term "meta-attribute" refers to data structures used to represent metadata fields at least employed for generating influence scores for metadata fields. meta-attributes combine a metadata field and its value into one value or one tuple. For example, if metadata field 'tablename' has the value 'customers' its corresponding meta-attribute may be 'tablename customers' or ('tablename', 'customers').

As used herein the term "anchor visualization" refers a visualization that a user may be viewing or otherwise interacting with. Typically, user may employ one or more user interface features to select or 'focus' on one or more visualizations, these visualizations may be considered anchor visualizations.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the innovations herein to provide a basic understanding of some aspects of the invention. This brief description is not intended as an extensive overview. It is not intended to fully identify key or critical elements, or to fully delineate or otherwise narrow the scope. Its purpose is merely to present some concepts in a simplified form as a prelude to the more detailed description that is presented later.

Briefly stated, various embodiments are directed to managing visualizations. In one or more of the various embodiments, a visualization associated with one or more community visualizations that are associated with an organization may be displayed for a user may be associated with the organization.

In one or more of the various embodiments, one or more fields of meta-data associated with the displayed visualization may be determined such that the one or more meta-data fields may be hidden from view in the displayed visualization. In some embodiments, determining the one or more meta-data fields may include determining the one or more meta-data fields from a plurality of meta-data fields based on one or more of a filter or a rule included in the recommendation model, wherein the plurality of meta-data fields include one or more of an author name, caption, visualization name, column name, table name, data source name, author role, author location, author organization, reference to another table, data model object name, creation date, last-accessed date, or the like.

In one or more of the various embodiments, a recommendation score may be generated for each of the community visualizations based on a recommendation model and the one or more meta-data fields such that the recommendation score may be based on a comparison of the one or more meta-data fields to one or more other meta-data fields associated with the one or more community visualizations. In some embodiments, generating the recommendation score for each of the community visualizations fields may include employing one or more machine learning actions to generate the recommendation score, wherein the one or more machine learning actions include one or more of Latent Semantic Analysis (LSA), Factorization Machines (FM), Cosine-similarity, Gradient Boosting Decision Trees (GBDTs), Term Frequency-Inverse Document Frequency (TF-IDF), discriminant analysis, or the like.

In one or more of the various embodiments, a top ranking of the one or more community visualizations may be determined such that the top ranking may be based on the recommendation score associated with each of the one or more community visualizations.

In one or more of the various embodiments, an influence score for each of the one or more other meta-data fields may be determined based on a proportion of a value each other meta-data field contributes to the recommendation score of a corresponding top ranked community visualization such that one or more top ranked other meta-data fields for each top ranked community visualization may be based on the influence score for each of the one or more other meta-data fields. In some embodiments, determining the influence score for each of the one or more other meta-data fields may include employing one or more influence models included in the recommendation model to determine the influence score based on one or more of one or more dominant topics determine by a topic model, one or more counts of the one or more other meta-data fields that include common values, or a magnitude of change to the recommendation score and a temporary recommendation score that is generated based on a temporary omission of one of the one or more other meta-data fields from the generation of the temporary recommendation score such that the influence score for each other meta-data field may be based on the magnitude of change that corresponds to its omission.

In one or more of the various embodiments, a report that includes a rank ordered list of the top ranked community visualizations and the one or more top ranked other meta-data fields may be provided to the user.

In one or more of the various embodiments, one or more sub-models that include one or more of, one or more heuristics, one or more trained machine learning models, or one or more filters may be provided such that the one or more sub-models may be included in the recommendation model. In some embodiments, one or more partial scores may be generated based on the one or more sub-models, the one or more meta-data fields or the one or more other meta-data fields. And, in some embodiments, the recommendation score for each community visualization may be determined based on a combination of the one or more partial scores such that the combination may be provided by the recommendation model.

In one or more of the various embodiments, one or more actions of the user that may be associated with the one or more top ranked community visualizations may be monitored. In some embodiments, information associated with the one or more actions may be stored in a data store. And, in some embodiments, the recommendation model may be updated based on the information stored in the data store.

In one or more of the various embodiments, a narrative may be associated with each top ranked community visualization based on its top ranked other meta-data fields such that the narrative includes a natural language explanation for a rank of each top ranked community visualization based on the one or more top ranked other meta-data fields associated with each top ranked community visualization.

Illustrated Operating Environment

FIG. 1 shows components of one embodiment of an environment in which embodiments of the innovations may be practiced. Not all of the components may be required to practice these innovations, and variations in the arrangement and type of the components may be made without departing from the spirit or scope of these innovations. As shown, system 100 of FIG. 1 includes local area networks (LANs)/ wide area networks (WANs)— (network) 110, wireless network 108, client computers 102-105, visualization server computer 116, data source server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, data source server computer 118, or other computers.

Client computers 102-105 may further be configured to include a client application that enables an end-user to log into an end-user account that may be managed by another computer, such as visualization server computer 116, data source server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, data source server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, data source server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116, data source server computer 118 are described in more detail below in conjunction with FIG. 3. Although FIG. 1 illustrates visualization server computer 116, data source server computer 118, or the like, each as a single computer, the innovations or embodiments are not so limited. For example, one or more functions of visualization server computer 116, data source server computer 118, or the like, may be distributed across one or more distinct network computers. Moreover, in one or more embodiments, visualization server computer 116, data source server computer 118 may be implemented using a plurality of network computers. Further, in one or more of the various embodiments, visualization server computer 116, data source server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
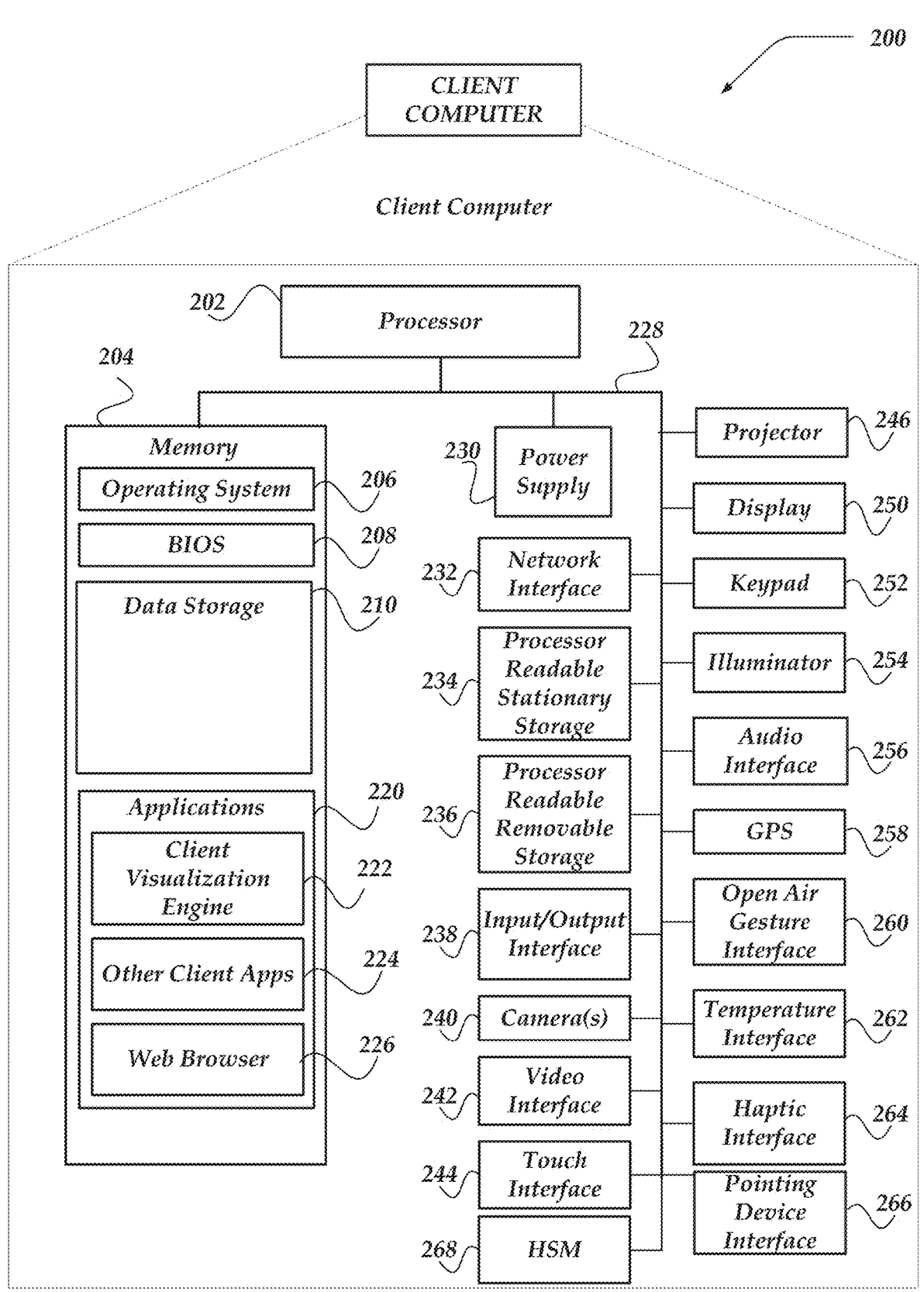
FIG. 2 is a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physic al eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (ALPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows, iOS, macOS, or the like. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
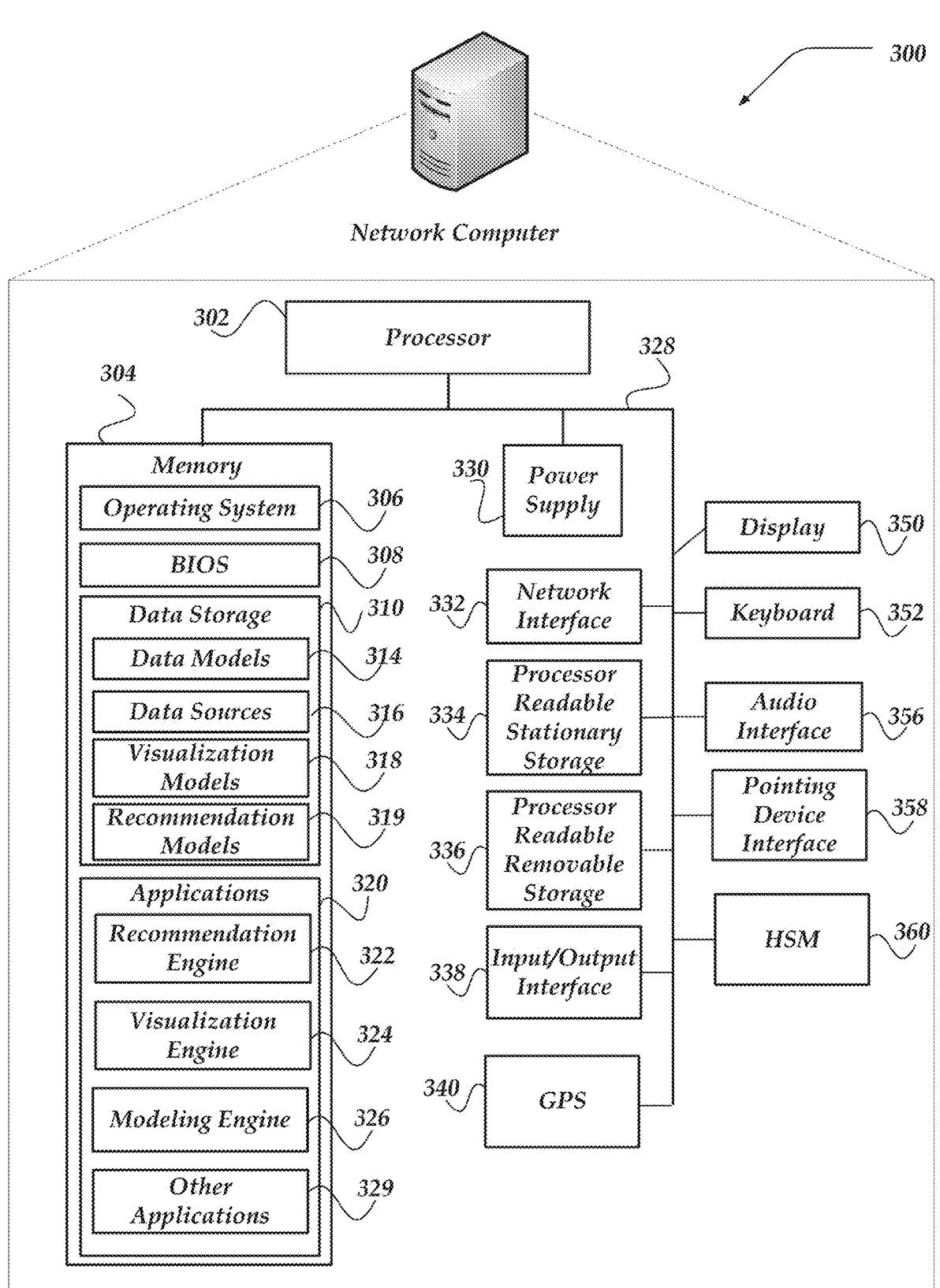
FIG. 3 is a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™ Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (ALPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, recommendation engine 322, visualization engine 324, modeling engine 326, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, data sources 316, visualization models 318, recommendation models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include recommendation engine 322, visualization engine 324, modeling engine 326, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, recommendation engine 322, visualization engine 324, modeling engine 326, other applications 329, or the like, may be operative in a cloud-based computing environment. In one or more of the various embodiments, these applications, and others, that comprise a visualization platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to recommendation engine 322, visualization engine 324, modeling engine 326, other applications 329, or the like, may be provisioned and de-commissioned automatically.

Also, in one or more of the various embodiments, recommendation engine 322, visualization engine 324, modeling engine 326, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
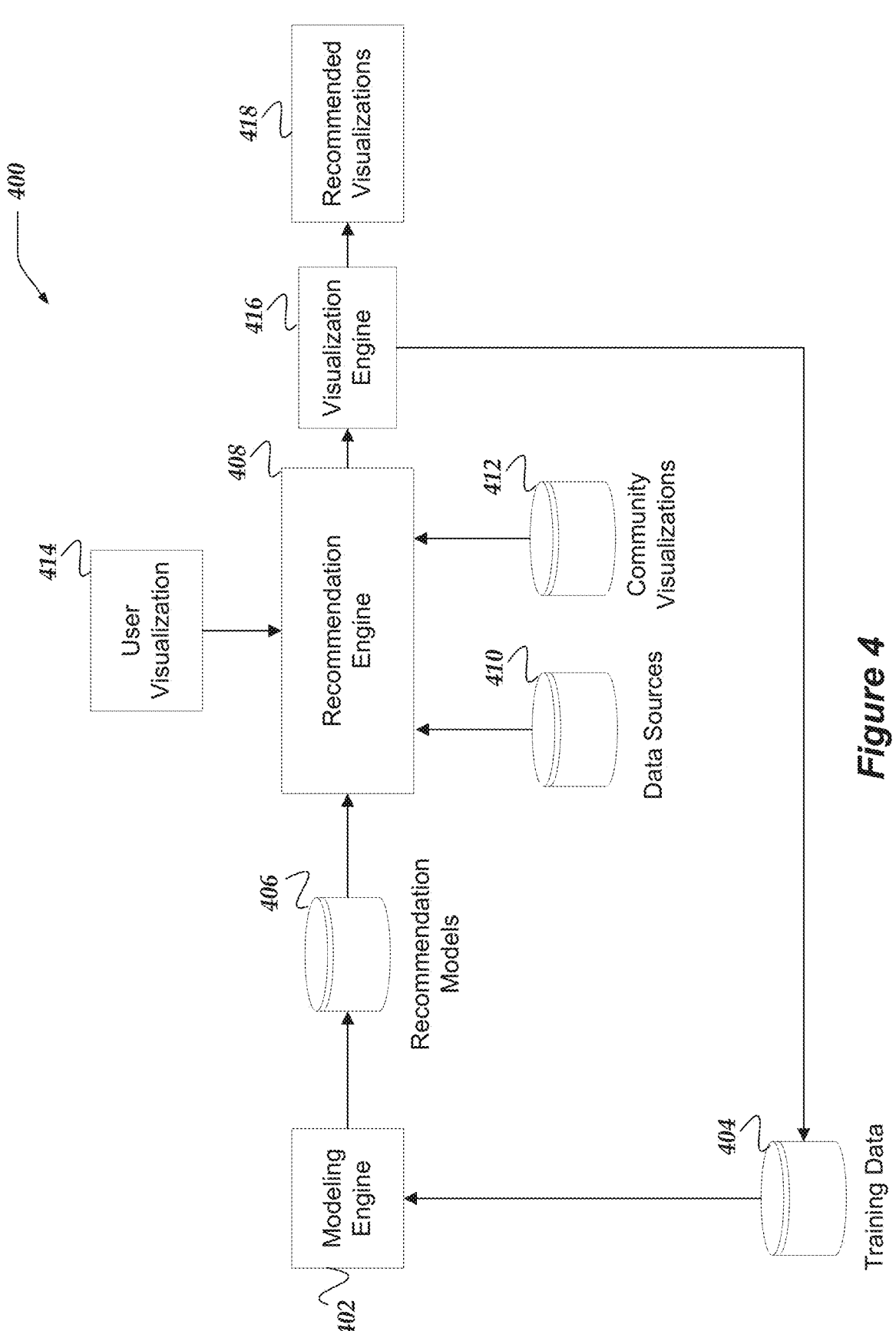
FIG. 4 illustrates a logical architecture of a system for content based related view recommendations in accordance with one or more of the various embodiments.

FIG. 4 illustrates a logical architecture of system 400 for content based related view recommendations in accordance with one or more of the various embodiments. In one or more of the various embodiments, system 400 may be comprised of various components, including, one or more modeling engines, such as, modeling engine 402;

In one or more of the various embodiments, system 400 may be arranged to include various components including, modeling engine 402, training data store 404, recommendation models data store 406, recommendation engine 408, data source(s) 410, community visualizations 412, user visualization 414, visualization engine 416; one or more recommended visualizations 418, or the like.

In one or more of the various embodiments, recommendation engines may be arranged to employ one or more recommendation models to recommend one or more visualizations to users based on one or more metadata fields associated with visualizations being employed by a user. Also, in some embodiments, visualization engines may be arranged to monitor user interactions with the recommended visualizations to generate metrics or telemetry information that may be used to evaluate the efficacy of the recommendation models based on user interactions with the recommended visualizations.

In one or more of the various embodiments, recommendation models may be arranged to recommend one or more visualizations based on the similarly of metadata that may be associated with the visualizations. In some embodiments, metadata may include text information that may be considered distinct from the content included or displayed in the visualizations. For example, in some embodiments, metadata may include author names, captions, visualization names, column names, table names, data source names, author roles, author location, author organization/department, data model object names, or the like. Note, one of ordinary skill in the art will appreciate that metadata may vary depending on local requirements or local circumstances. Thus, examples of metadata described here or throughout this detailed description should be considered non-limiting examples of metadata that are at least sufficient for disclosing the innovations included herein.

In one or more of the various embodiments, recommendation models may be arranged to be modular such that various heuristics, machine learning models, filters, or the like, may be included in a recommendation model. In one or more of the various embodiments, modules may be modified, replaced, or added to recommendation models. Accordingly, in some embodiments, recommendation models may be tailored to local circumstances or local requirements. Likewise, in some embodiments, if additional heuristics or machine learning methods are proven or discovered to be effective in offline experiments or by observation of production environments, they may be included in recommendation models.

In one or more of the various embodiments, one or more portions of recommendation models may be focused on employing natural language processing of text content included in the metadata fields. In some embodiments, different recommendation models or portions of recommendation models may be arranged to employ techniques, such as, Latent Semantic Analysis (LSA), factorization machines (FM), Cosine-similarity, gradient boosting decision trees (GBDTs), term frequency-inverse document frequency (TF-IDF), discriminant analysis, or the like, for content based related view recommendations. In some embodiments, different types or instances of recommendation models may be trained or tested for different circumstances. For some embodiments, one of ordinary skill in the art will appreciate the recommendation models may be subject to continuous testing, tuning, or improvement while in use by an organization. In some cases, existing recommendation models may fall out of favor while new recommendation models, perhaps comprising new modeling methods, heuristics, parameters, or the like, may be deployed. Thus, one of ordinary skill in the art will appreciate that these innovations are not limited to fixed set of recommendation models rather they may be expected to change or evolve overtime within a given organization or access organizations.

In one or more of the various embodiments, because recommendation models may be arranged to support individual organizations or users of individual organizations, each organization may have different training data. Accordingly, in some embodiments, training data may vary widely in quantity or characteristics. In some cases, organizations may have accumulated many visualizations before content based related view recommendations has been enabled. In contrast, in some embodiments, other organizations may have activated visualization recommendations before they have created enough visualizations for training their recommendation models.

Accordingly, in some embodiments, one or more baseline models may be provided to enable meaningful recommendations for organizations that may not have sufficient training data. In some embodiments, baseline models may be trained based on training data that may be based on public shared data. In some embodiments, shared data may be provided by other users or organizations that have volunteered to provide some or all of their visualizations for training baseline models.

Thus, in some embodiments, organizations that lack sufficient data for training their own recommendation models may be provided one or more recommendation models that are based on baseline models. As they generate their own training data, it may be employed for training recommendation models based on their own data.

FIG. 5 illustrates a logical schematic of a portion of system 200 showing some metadata for content based related view recommendations in accordance with one or more of the various embodiments. In some embodiments, visualization systems may be arranged to define various metadata for visualizations. Also, in one or more of the various embodiments, visualization systems may be arranged to define metadata for other parts of the visualization system, such as, users, data sources, projects, annotations, tags associated with objects in the system, permissions/privileges associated with objects or users, or the like. In some embodiments, one or more metadata fields may be included or omitted from consideration depending on local circumstances or local requirements. Accordingly, in some embodiments, metadata fields determined to be relevant or otherwise useful for content based related view recommendations may be determined based on configuration information.

In one or more of the various embodiments, metadata may be associated with different scopes or contexts. In this example, table 502 represents a list of table names that may be defined for a database schema or the like.

Also, in this example, for some embodiments, table 504 represents a list of metadata fields alongside their data type. In this example, table 504 may be considered to include the columns defined for a table that stores metadata associated with visualizations.

Finally, in this example, table 506 represent a table with metadata field values for visualizations, such that each row represents metadata field values for a separate visualization.

One of ordinary skill in the art will appreciate that in production environments there may be more or different metadata fields than depicted here. However, one of ordinary skill in the art will appreciate the metadata depicted here is sufficient for at least disclosing the innovations described herein Similar, while this example represents metadata using tables, the one or more data structures employed to represent metadata fields or collections of metadata fields may use a variety of data structures, including, lists, arrays, dictionaries, vectors, sparse arrays, trees, or the like, without departing from the scope of these innovations.

Figure 6:
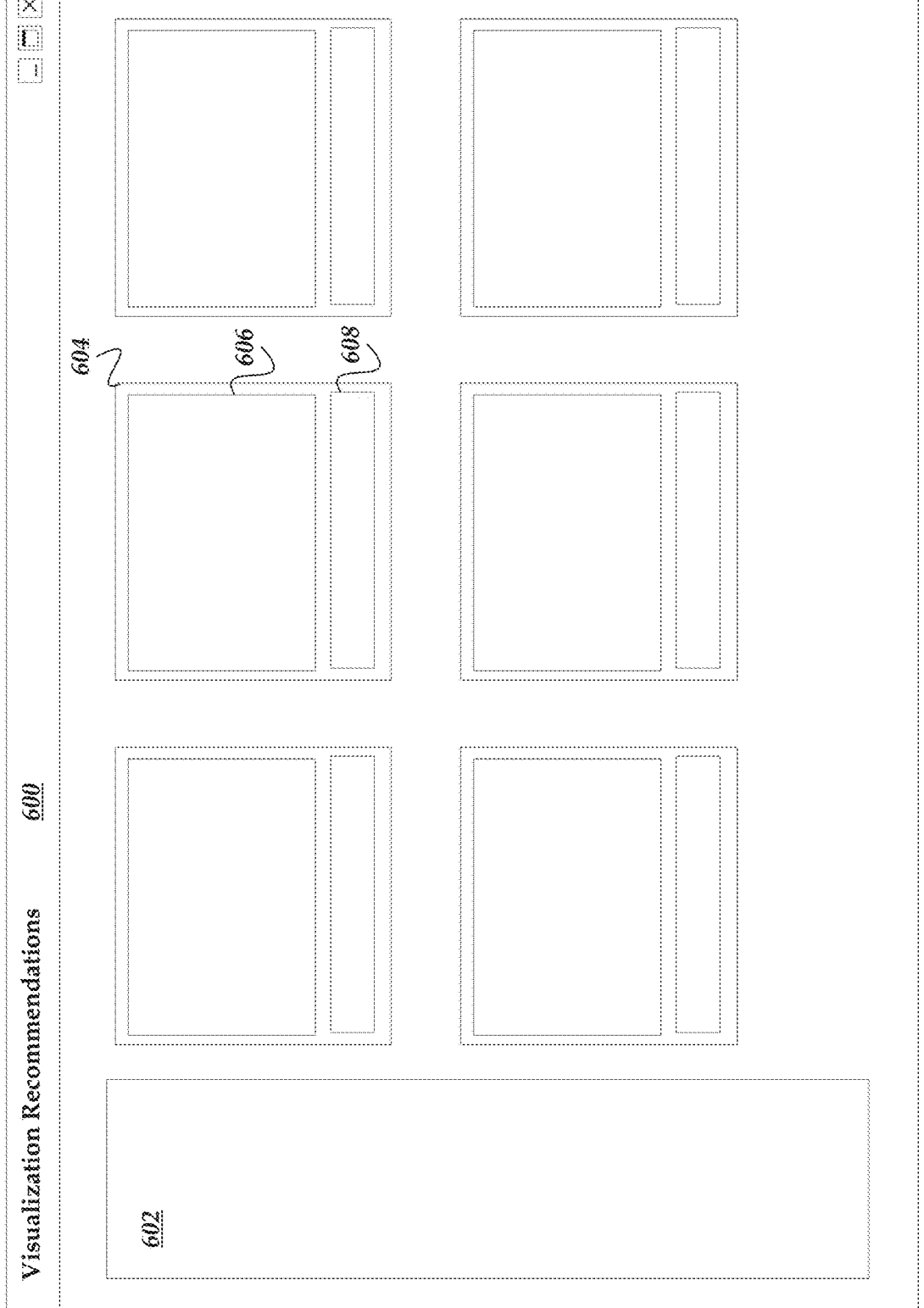
FIG. 6 illustrates a logical representation of a portion of a user interface for content based related view recommendations in accordance with one or more of the various embodiments.

FIG. 6 illustrates a logical representation of a portion of user interface 600 for content based related view recommendations in accordance with one or more of the various embodiments. In some embodiments, user interface 600 may be arranged to include one or more panels, such as, panel 602, panel 604, or the like.

In one or more of the various embodiments, user interface 600 may be arranged to display one or more recommended visualizations to a user. In some embodiments, panels, such as, panel 604 may display compact representations (e.g., thumbnails, or the like) of recommended visualizations. In this example, sub-panel 606 may represent a compact visual representation of a recommended visualization. Also, in some embodiments, additional information, including explanatory natural language explanation narratives may be displayed (or accessed via) sub-panels, such as, sub-panel 608. For example, in some embodiments, sub-panel 608 may include a narrative that explains which metadata fields had the most influence on in recommending the visualization shown in sub-panel 606.

In one or more of the various embodiments, the panels associated with the recommended visualizations may be displayed in rank order based on a recommendation score associated with the quality or strength of a given recommendation.

Accordingly, in some embodiments, users may be enabled to select a visualization from the collection of displayed recommended visualizations.

In one or more of the various embodiments, panels, such as, panel 604 may be associated with other User Interface elements that may enable users to provide a score that represents their agreement or disagreement with the recommendations. Accordingly, in some embodiments, modeling engines may employ these scores to modify or grade recommendation models for the user or other users in the same organization.

In one or more of the various embodiments, explanatory narratives associated with the recommended visualizations may describe the reason why a given visualization has been recommended. In some embodiments, narrative text may be associated with one or more metadata fields. For example, for some embodiments, if the strongest signal for recommending a visualization may be the content of its caption field, the narrative information associated with the recommendation may include narrative text that explains that recommendation has been made based on the similarity of the caption to the captions of the other visualizations used by the user.

In one or more of the various embodiments, user interface 600 may be arranged to enable users to drill down (e.g., through sub-panel 608) to explore additional details associated with a given recommendation.

Generalized Operations

FIGS. 7-13 represent generalized operations for content based related view recommendations in accordance with one or more of the various embodiments. In one or more of the various embodiments, processes 700, 800, 900, 1000, 1100, 1200, and 1300 described in conjunction with FIGS. 7-13 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-11 may be used for content based related view recommendations in accordance with at least one of the various embodiments or architectures such as those described in conjunction with FIGS. 4-6. Further, in one or more of the various embodiments, some or all of the actions performed by processes 700, 800, 900, 1000, 1100, 1200, and 1300 may be executed in part by recommendation engine 322, visualization engine 324, modeling engine 326 one or more processors of one or more network computers.

FIG. 7 illustrates an overview flowchart for process 700 for content based related view recommendations in accordance with one or more of the various embodiments. After a start block, at block 702, in one or more of the various embodiments, a visualization associated with a collection of community visualizations may be displayed. Typically, this visualization may a visualization that a user may be interacting with via a user interface or interactive report. In some embodiments, if a user may be viewing more than one visualization, recommendations may be generated for one or more the display visualizations.

At block 704, in one or more of the various embodiments, recommendation engines may be arranged to determine one or more metadata fields associated with displayed visualization. At block 706, in one or more of the various embodiments, the recommendation engines may be arranged to rank the one or more community visualizations based on the similarities of the metadata fields associated with each community visualization with the metadata fields associated with the displayed visualization.

In one or more of the various embodiments, recommendation engines may be arranged to employ recommendation models to generate recommendation scores for each community visualizations. In one or more of the various embodiments, recommendation engines may be arranged to rank the community visualizations based on the recommendation scores associated with each community visualization.

At block 708, in one or more of the various embodiments, recommendation engines may be arranged to determine influence scores for each metadata field of the recommended visualizations based on their contribution to the recommendation scores.

At block 710, in one or more of the various embodiments, recommendation engines may be arranged to provide information that may be provided in a user interface or interactive report showing the one or more recommended visualizations to a user. Next, in one or more of the various embodiments, control may be returned to a calling process.

Figure 8:
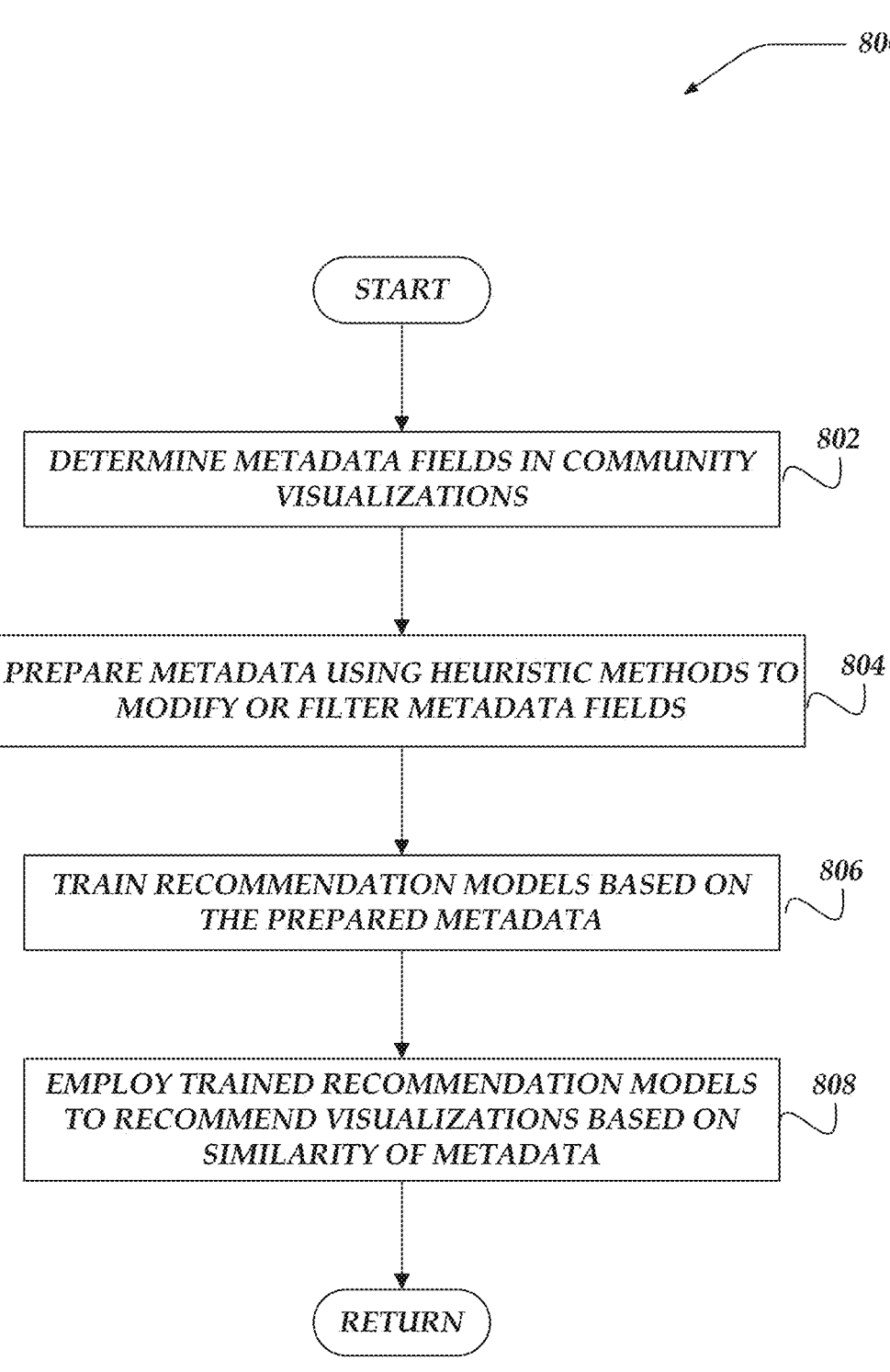
FIG. 8 is a flowchart for a process for generating recommendation models for content based related view recommendations in accordance with one or more of the various embodiments.

FIG. 8 illustrates a flowchart for process 800 for generating recommendation models for content based related view recommendations in accordance with one or more of the various embodiments. After a start block, at block 802, in one or more of the various embodiments, modeling engines may be arranged to determine one or more metadata fields in one or more community visualizations. In one or more of the various embodiments, one or more metadata fields may be determined unsuitable for using for content based related view recommendations. Accordingly, in some embodiments, recommendation engines may be arranged to selectively determine metadata field for consideration from among a larger set of metadata fields. In some embodiments, recommendation engines may be arranged to employ rules, lists, filters, or the like, provided via configuration information to determine the metadata fields considers providing recommendations.

Also, in one or more of the various embodiments, one or more recommendation models may be arranged to provide an interface that defines the metadata fields that may be required (or optional) for the recommendation models to generate recommendation scores for recommended visualizations.

At block 804, in one or more of the various embodiments, the modeling engines may be arranged to prepare the metadata using one or more heuristic methods to modify or filter the one or more metadata fields. In one or more of the various embodiments, one or more conventional data preparation methods may be applied to values of one or more metadata fields, such as, tokenizing, removing stop words, normalizing capitalization, spelling correction, or the like. In some embodiments, semantic analysis may be employed to collapse one or more metadata field values or otherwise identify differing content that may have the same meaning.

In one or more of the various embodiments, one or more metadata fields may be associated with particular heuristics of filters. For example, metadata fields that may be restricted to single word values may be processed differently than metadata fields that often include sentences or paragraphs of words.

At block 806, in one or more of the various embodiments, the modeling engines may be arranged to train one or more recommendation models based on the prepared metadata. In one or more of the various embodiments, recommendation models may be arranged to include one or more sub-models or modules that require training. Accordingly, in some embodiments, recommendation engines may be arranged to execute the required training as defined for a given recommendation model.

At block 808, in one or more of the various embodiments, recommendation engines may be arranged to employ the one or more recommendation models to recommend one or more visualizations based on similarity of metadata. Next, in one or more of the various embodiments, control may be returned to a calling process.

FIG. 9 illustrates a flowchart for process 900 for content based related view recommendations in accordance with one or more of the various embodiments. After a start block, at block 902, in one or more of the various embodiments, recommendation engines may be arranged to determine one or more metadata fields associated with the input visualization. In some embodiments, input visualizations may be visualizations currently being displayed to a user.

In one or more of the various embodiments, input visualizations may be selected based on the current visualizations a user may be interacting with. In some embodiments, recommendation engines may be arranged to automatically employ visualizations that users may be actively viewing as input visualizations. In some embodiments, user interfaces may include one or more user interface controls that enable a user to activate recommendation features or selectively request to receive recommendation reports.

In one or more of the various embodiments, recommendation engines may be arranged to iterate across various metadata sources to determine the metadata fields that may be employed as input values for determining one or more recommended visualizations. As described above, in some embodiments, recommendation engines may be arranged to determine metadata fields from one or more of data sources, database tables, visualization models, data models, or the like. Also, in one or more of the various embodiments, recommendation engines may be arranged to determine one or more metadata fields from telemetry information, such as, view counts, last-used dates, other popularity metrics, or the like.

In one or more of the various embodiments, recommendation engines may be arranged to filter, format, merge, modify, or the like, metadata fields or metadata fields values to conform to input specifications of one or more recommendation models. For example, in some cases, a metadata field such as 'table_name' may be concatenated with a column name such as 'last_accessed' to provide metadata field 'table_name.last_accessed' to distinguish it from other similarly named columns.

In some embodiments, recommendation engines may be arranged to store one or more metadata fields using fully qualified identifiers that may distinguish them from other similarly named metadata fields.

Also, in one or more of the various embodiments, recommendation engines may be arranged to perform one or more actions to clean, normalize, or other prepare metadata field values before providing them to recommendation models. In some embodiments, this may include correcting spelling, normalization capitalization, rounding or truncating numerical values, word substitution (e.g., mapping semantically similar words a common word), truncating long strings, removing so-called stop words from phrases, or the like.

Also, in one or more of the various embodiments, recommendation engines may be arranged to perform additional actions to pre-process or pre-compute one or more attributes, statistics, metrics, or the like, associated with metadata fields or metadata fields values. For example, in some embodiments, recommendation engines may be arranged to compute one or more metrics, such as, entropy, perplexity, or the like, for (natural language) text phrases or text block included in one or more metadata fields. In some embodiments, recommendation engines may be arranged to compute or generate one or more synthetic metadata fields that may be included with the one or more metadata fields pulled from other sources.

Accordingly, in some embodiments, recommendation engines may be arranged to determine rules, locations, or the like, for determining metadata fields sources, metadata fields, metadata field formatting, or the like based on configuration information to account for local circumstances or local requirements.

At block 904, in some embodiments, recommendation engines may be arranged to determine one or more community visualizations to consider for recommendation. In one or more of the various embodiments, community visualizations available to a user may include one or more community visualizations that may be excluded from consideration for various reasons. In some embodiments, one or more community visualizations may be excluded based on user preferences, organization preferences, or the like. Also, in some embodiments, recommendation models may include one or more front-side heuristics that exclude one or more community visualizations from consideration. For example, in some embodiments, a user may prefer to exclude community visualizations that may be associated with certain business units, or the like. Also, for example, for some embodiments, users may be enabled to exclude visualizations for various reasons such as, various metadata field values (e.g., age, last-accessed-date, user, or the like), languages (e.g., English, Spanish, or the like), types of visualizations, or the like.

Further, in one or more of the various embodiments, recommendation engines may be arranged to enable users or organizations to exclude one or more visualizations from being considered for recommendation based on one or more metadata field values that experience indicates may be associated with visualizations that may be unsuitable consideration for recommendations. For example, in some embodiments, users may observe that visualizations associated with particular tag/status metadata field values such as, "test," "broken," "private," "incomplete," or the like, should be excluded from consideration for recommendations.

Likewise, in some embodiments, modeling engines may be arranged to identify one or more metadata field values that indicate certain visualization may be unsuitable consideration for recommendations. For example, in some embodiments, during recommendation model training, visualizations associated with tag/status metadata field values such as, "test," "broken," "private," "incomplete," or the like, may be determined to be excluded from consideration.

Further, in some embodiments, one or more particular recommendation models may be ineffective at providing recommendations for one or more classes or categories of visualizations while at the same time being effective for other classes or categories of visualizations. Thus, in some embodiments, one or more community visualizations may be excluded from consideration depending on the recommendation models being used.

At block 906, in one or more of the various embodiments, recommendation engines may be arranged to employ one or more content focused classifiers, or the like, to determine one or more partial recommendation scores for one or more community visualizations based on metadata field similarity with the input visualization.

In one or more of the various embodiments, modeling engines may be arranged to generate recommendation models that include one or more portions or one or more sub-models that may be trained or otherwise directed to employ content or values of metadata fields to generate recommendation scores associated with the similarity of metadata field content with the community visualizations that may be available.

Accordingly, in one or more of the various embodiments, recommendation engines may be arranged to compare metadata field values from the input visualization with metadata field values from one or more community visualizations.

In one or more of the various embodiments, one or more sub-models comprising a recommendation model may be directed to evaluating or comparing one or more metadata fields that include text values. Also, in some embodiments, one or more sub-models comprising recommendation models may be directed to evaluating metadata fields that include numerical values.

In one or more of the various embodiments, one or more community visualizations may be associated with one or more aberrations, such as, one or more missing/omitted metadata fields, one or more empty metadata fields, or the like. Accordingly, in some embodiments, one or more recommendation models may be arranged to provide default values as needed. Alternatively, in some embodiments, recommendation engines or recommendation models may be arranged to exclude one or more community visualizations from consideration based on one or more missing metadata field values.

At block 908, in one or more of the various embodiments, recommendation engines may be arranged to generate one or more other partial recommendation scores based on one or more of recency, popularity, local preferences, rules, or the like.

In one or more of the various embodiments, recommendation models may be arranged to include one or more sub-models that are based on heuristics or otherwise may not be determined based on machine learning training, or the like. In some embodiments, these may include sanity checks that may be directed at de-ranking one or more visualizations that may be outliers or otherwise demonstrably anomalous. For example, in some embodiments, visualizations older than a defined age threshold may be de-ranked. Further, for example, visualizations that omit one or more metadata fields may be de-ranked to account for the impact of assigned default values that may be associated with strong signal metadata fields, or the like.

In one or more of the various embodiments, recommendation models may be arranged to define one or more conditions, rules, threshold values, or the like, for generating partial scores based on one or more metrics associated with the community visualizations. In some embodiments, one or more of these metrics may depend on telemetry information associated with other users that may be collected by visualization engines, such as, number of views by other users, number times a visualization is recommended to other users, number of times a visualization is selected from a recommendation list by other users, or the like. Likewise, in some embodiments, similar telemetry metrics for the current user may be employed in rules, conditions, or the like, for scoring community visualizations.

At block 910, in one or more of the various embodiments, the recommendation engines may be arranged to generate one or more recommendation scores based on combinations of the one or more partial recommendation score, the one or more other partial recommendation scores, or the like.

In one or more of the various embodiments, recommendation models may be arranged to include one or more formulas for computing recommendation scores from one or more partial scores. In some embodiments, recommendation models may be arranged to compute recommendation scores based on linear combination of the partial scores. In some embodiments, a sum of some partial scores may be divided a sum of other scores, or the like. Accordingly, in some embodiments, the particular combination formula may be defined as part of a recommendation model.

In one or more of the various embodiments, if the partial scores may be based on more than recommendation model, individual recommendation models may be associated with weights or coefficients that influence their contribution to the overall recommendation scores associated with each community visualization.

Further, in some embodiments, recommendation engines may be arranged to consider additional scores, such as, confidence scores, or the like, that may be associated one or more partial scores if partial scores are being combined.

At block 912, in one or more of the various embodiments, the recommendation engines may be arranged to rank order one or more community visualizations based on the recommendation scores. In one or more of the various embodiments, recommendation engines may be arranged to employ the recommendation scores associated with each community visualization that was evaluated to rank the one or more community visualizations.

At block 914, in one or more of the various embodiments, recommendation engines may be arranged to filter the rank ordered list of recommended visualizations. In one or more of the various embodiments, recommendation engines may be arranged to apply one or more filters to reduce the number of community visualizations in the rank ordered list. Alternatively, in some embodiments, recommendation engines may be arranged to provide all of the rank ordered visualizations to a visualization engine that may determine how many to display in a user interface.

Also, in one or more of the various embodiments, recommendation models may be arranged to include one or more filters that may be executed on the collection of rank ordered community visualizations. In one or more of the various embodiments, these back-side filters may be employed to modify the ranking or discard one or more community visualizations from the collection. In one or more of the various embodiments, a recommendation model may be arranged to demote a ranked visualization because its position may appear anomalous or spurious. For example, for some embodiments, if a visualization may be ranked higher than other visualizations because it had extremely high partial scores associated with one or more metadata fields that historically may be poorly correlated with user preferences, that visualization may be bumped down in rank to be more consistent with its partial scores associated with more influential metadata fields.

In one or more of the various embodiments, recommendation engines may be arranged to store information that includes the recommendations/ranking along with other relevant information, such as, the recommendation models that were used, the user, the organization, time/date the recommendations were made, or the like. Accordingly, in some embodiments, the efficacy of recommendations or recommendation models may be evaluated later.

Next, in one or more of the various embodiments, control may be returned to a calling process.

Figure 10:
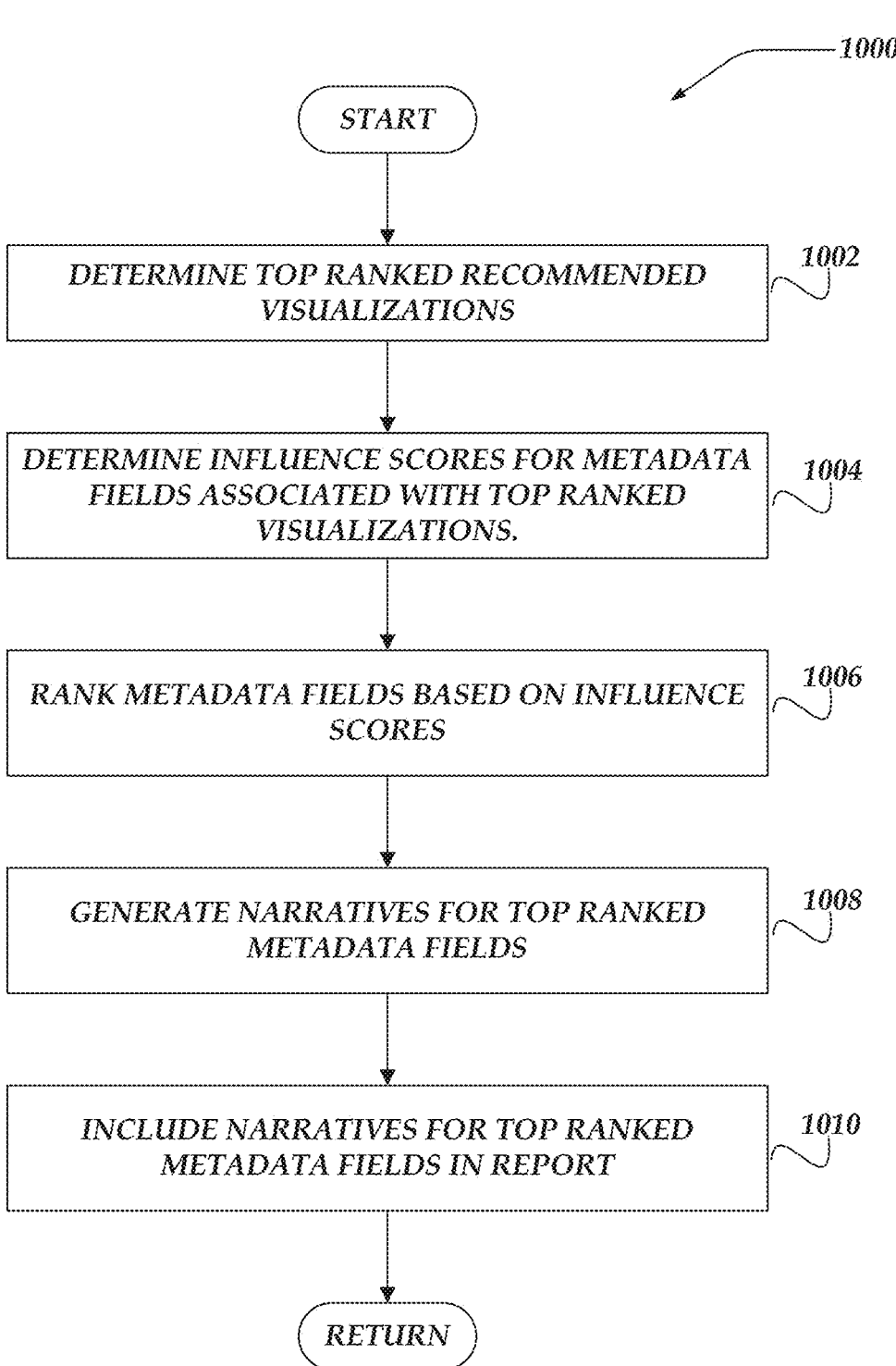
FIG. 10 is a flowchart for a process for content based related view recommendations in accordance with one or more of the various embodiments.

FIG. 10 illustrates a flowchart for process 1000 for content based related view recommendations in accordance with one or more of the various embodiments. After a start block, at block 1102, in one or more of the various embodiments, recommendation engines may be arranged to determine one or more top ranked recommended visualizations based on recommendation models or recommendation scores.

Also, in some embodiments, recommendation engines may be arranged to evaluate the contribution individual metadata fields to the determination of the recommendation score for each recommended visualization.

Accordingly, in some embodiments, recommendation models may include one or more modules that may be directed to determining influence scores for one or more of the metadata fields used for determining the one or more recommended visualizations.

At block 1004, in one or more of the various embodiments, recommendation engines may be arranged to determine one or more influence scores for one or more of the metadata fields associated with each of the top ranked recommended visualizations.

In one or more of the various embodiments, recommendation engines may be arranged to employ one or more recommendation models that may define different strategies, criteria, or the like, for identifying metadata field contributions to recommendation models associated with visualizations. However, in some embodiments, the relative contribution of a metadata field may be represented by one or more values referred to herein as influence scores.

Accordingly, in one or more of the various embodiments, below listed examples may be based on instructions, rules, sub-models, or the like, included in recommendation models. For clarity or brevity portions of the recommendation models associated with determining influence scores of metadata fields may be referred to as influence models.

In one or more of the various embodiments, one or more influence models may be arranged to rank metadata fields based on the evaluating commonalities of the values for a given metadata field across the ranked visualizations. Accordingly, in some embodiments, influence scores (or partial scores) of metadata fields may be based on a count of the number top ranked visualizations that share the same values. In some embodiments, recommendation engines may be arranged to one or more comparisons or evaluation to determine if metadata fields for visualizations have a common value. In some embodiments, metadata field values in visualizations may be tokenized before comparing with values from other visualizations. Also, in one or more of the various embodiments, metadata field values in visualizations may be compared directly with values from other visualizations. Further, in some embodiments, one or more fuzzy match strategies may be employed to compare metadata field values across visualizations.

In some embodiments, one or more influence models may be arranged determine influence scores (or partial scores) by computing the effects on the recommendation scores if individual metadata fields are removed from consideration. Accordingly, in one or more of the various embodiments, the impact of individual metadata fields may be evaluated based on the how much recommendation scores or rank order of visualizations change if a given metadata field is omitted during the determination of recommendation scores. Thus, in some embodiments, the changes to recommendation scores associated with individually omitted metadata fields may be measured or otherwise mapped to influence scores or partial influence scores.

In one or more of the various embodiments, recommendation engines may be arranged to train one or more train one or more topic models based on Latent Semantic Analysis (LSA), or the like, to determine dominant topics for ranked visualizations based on the metadata fields. Accordingly, in some embodiments, values included in metadata fields may be evaluated using topic models to identify the dominant topics. Thus, in some embodiments, the dominant topics may be mapped back to their associated metadata fields to evaluate the influence of each metadata field.

In some embodiments, one or more metadata fields may be excluded from one or more evaluations based on various considerations, such as, privacy, efficacy, relevancy, empirical evidence of providing misleading signals, or the like. In some embodiments, recommendation engines may be arranged to incorporate user feedback or telemetry information to evaluate the efficacy or quality of the influence scores. In some embodiments, metadata fields that may be associated with misleading results may be down weighted or removed from consideration.

Also, in some embodiments, recommendation models may be arranged to weight partial influence scores provided by influence models based on performance, user preference, telemetry information, or the like. Further, in some embodiments, different influence models may be selected based on one or more considerations, such as, number of metadata fields, distribution of recommendation scores, or the like. Further, in some embodiments, influence models may be applied progressively such that the results of a prior executed influence model may influence the selection of a subsequent influence model. For example, for some embodiments, if a first influence model provides result with a confidence value that exceeds a threshold value, the determination of influence score may be halted. In contrast, for some embodiments, if a first influence models provides inconclusive results, another influence model may be selected and executed.

In one or more of the various embodiments, recommendation engines may be arranged to combine two or more partial influence scores associated with different influence models to provide a single influence score for one or more metadata fields. In one or more of the various embodiments, recommendation models may include rules, formulas, instructions, or the like, for combining partial influence scores into a single score that may be associated with a metadata field.

At block 1006, in one or more of the various embodiments, the recommendation engines may be arranged to rank the one or more metadata fields for each top ranked recommended visualization based on the one or more influence scores.

In some embodiments, recommendation engines may be arranged to provide an overall ranking of metadata fields as well as ranking metadata fields within each visualization. For example, in some embodiments, the ranking/score of each metadata field across the visualizations may be considered to determine an overall ranking of a given metadata field.

At block 1008, in one or more of the various embodiments, the recommendation engines may be arranged to generate narratives for one or more top ranked recommended visualizations.

In one or more of the various embodiments, recommendation models may include modules or sub-models directed to mapping explanatory text narratives to top ranked metadata fields for display to users. In some embodiments, one or more templates may be pre-generated for one or more different metadata fields. Accordingly, in some embodiments, one or more metadata fields may be associated with a narrative that may provide a human readable description of the metadata field or its influence on the recommendations.

At block 1010, in one or more of the various embodiments, the recommendation engines may be arranged to include the narratives for the one or more top ranked metadata fields in report information associated with the one or more top ranked recommended visualizations.

In one or more of the various embodiments, recommendation engines may be arranged to provide the ranked list of recommended visualizations to a visualization engine for display to users in a user interface or interactive report.

Next, in one or more of the various embodiments, control may be returned to a calling process.

Figure 11:
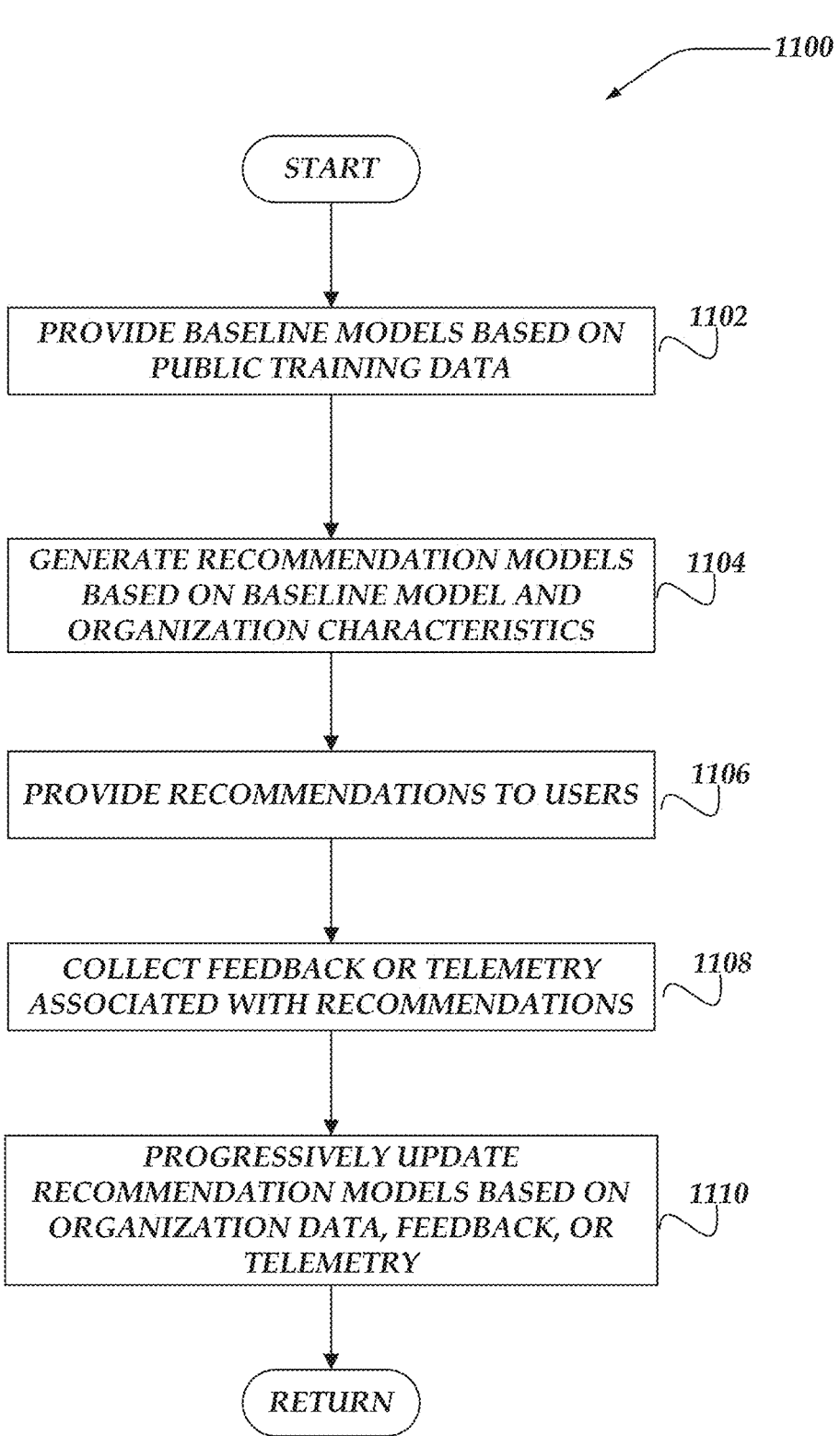
FIG. 11 is a flowchart for a process for providing initial recommendation models based on a baseline model in accordance with one or more of the various embodiments.

FIG. 11 illustrates a flowchart for process 1100 for providing initial recommendation models based on a baseline model in accordance with one or more of the various embodiments. After a start block, at block 1102, in one or more of the various embodiments, recommendation engines may be arranged to provide one or more baseline models that may be based on public or common training data.

In one or more of the various embodiments, if an organization begins using the visualization system, customized or personalized recommendation models may be unavailable. Accordingly, one or more baseline models that may be based on public, shared, or common data may be provided. In some embodiments, baseline models may be trained using community data. In some embodiments, community data may be based on real data associated with other organizations. Accordingly, in some embodiments, community data may be real data that has been stripped of sensitive information. In some embodiments, organizations may be enabled to opt-in to have some or all of their historical interaction information included in a community data program.

Also, in some embodiments, a visualization system may offer a free or public service that may be used for collecting interaction information that may employed to train baseline models.

In one or more of the various embodiments, baseline models may be directly derived from one or more existing recommendation models. In some embodiments, less complex or less detailed versions of recommendation models may be used as baseline models. In some cases, for some embodiments, recommendation models expressly trained for one or more organizations may be used as baseline models for new organizations.

In one or more of the various embodiments, different baseline models may be provided for use with different types of organizations or users. In some embodiments, baseline models may be maintained for different types of industries, problem domains, countries, or the like. Accordingly, in one or more of the various embodiments, commonalities that may exist within industries, problem domains, countries, or the like, may be represented in one or more baseline models.

At block 1104, in one or more of the various embodiments, recommendation engines may be arranged to generate one or more recommendation models based on the one or more baseline models and one or more characteristics of the organization.

In one or more of the various embodiments, an initial organization profile may be developed based on known or provided information. In one or more of the various embodiments, an organization profile may include information, such as, industry, problem domain, country, number of employees, enterprise size, revenue, or the like.

Accordingly, in some embodiments, a recommendation engine may be arranged to map one or more baseline models to an organization based on one or more mapping rules. In some embodiments, recommendation engines may be arranged to determine the rules for mapping baseline models to organizations based on configuration information.

At block 1106, in one or more of the various embodiments, recommendation engines may be arranged to recommend one or more visualizations to users based on metadata field similarity. In one or more of the various embodiments, recommendation engines may be arranged to employ metadata fields of a displayed visualization as inputs to one or more recommendation models to generate recommendation scores for one or more community visualizations. Accordingly, in some embodiments, one or more visualizations may be recommended based on the recommendation scores generated by the one or more recommendation models.

At block 1108, in one or more of the various embodiments, recommendation engines may be arranged to collect user telemetry or user feedback associated with the recommended visualizations. In one or more of the various embodiments, if recommended visualizations are presented to user, the recommendation engines may request feedback from the users regarding agreement or disagreement with the recommendations or the ranking of the recommended visualizations.

Also, in one or more of the various embodiments, visualization engines may be arranged to monitor how users interact with recommended visualizations to provide metrics that may be used for evaluating the effectiveness of the recommendation models that determined the recommended visualizations.

At block 1110, in one or more of the various embodiments, recommendation engines may be arranged to progressively update one or more recommendation models based on changes to organization information, user feedback, user telemetry, number of available community visualizations, or the like. In one or more of the various embodiments, if one or more metrics associated with the information collected for an organization or the users may exceed one or more thresholds, modeling engines may be arranged to re-train or discard one or more associated recommendation models. Also, in some embodiments, the collected metrics or information may be stored for inclusion in training data for an organization.

Next, in one or more of the various embodiments, control may be returned to a calling process.

Figure 12:
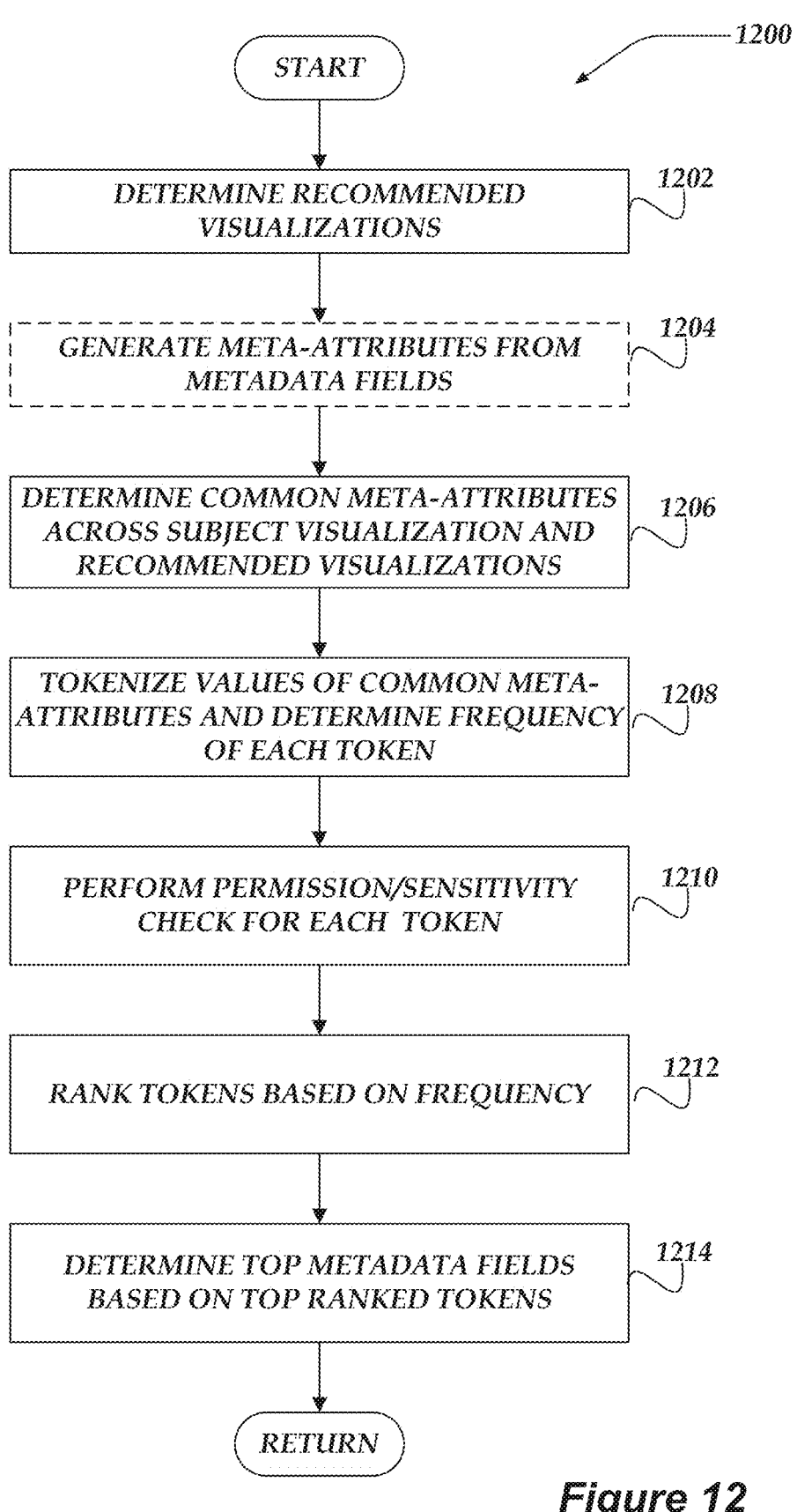
FIG. 12 is a flowchart for a process for evaluating metadata fields to provide a summary narrative associated the recommended visualizations in accordance with one or more of the various embodiments.

FIG. 12 illustrates a flowchart for process 1200 for evaluating metadata fields to provide a summary narrative or explanation associated the recommended visualizations in accordance with one or more of the various embodiments.

After a start block, at block 1202, in one or more of the various embodiments, as described above, recommendation engines may be arranged to determine one or more recommended visualizations. In one or more of the various embodiments, the recommendations may be based on a visualization a user may be interacting with.

According, in some embodiments, recommendation engines may be arranged to evaluate metadata fields associated with the recommended visualizations to determine which metadata fields had the most influence on determining the recommendations.

At block 1204, in one or more of the various embodiments, optionally, recommendation engines may be arranged to generate meta-attributes based on the metadata fields associated with anchor visualization and the one or more recommended visualizations.

In one or more of the various embodiments, meta-attributes may be generated by combining metadata field labels with their respective metadata field values. For example, in some embodiments, if a visualization has a metadata field of 'tablename' with a value of 'sales', the meta-attribute 'tablename_sales' may be generated. Likewise, for example, a metadata field of 'fieldname' with a value 'campaign name' may produce a meta-attribute of 'fieldname_campaign name'.

Alternatively, in some embodiments, meta-attributes may be represented using tuples, such as, referring to the two examples above, ('tablename', 'sales') or ('fieldname', 'campaign name'), or the like. Similarly, one of ordinary skill in the art will appreciate that other data structures or formats may be used to represent meta-attributes without departing from the scope of these innovations.

In some embodiments, the portion of the meta-attribute that corresponds to the metadata field value, may be considered a meta-attribute value or the simply the metadata field value.

Note, this block is marked optional because in some embodiments, meta-attributes may be generated prior to the execution of process 1200. For example, recommendation engines may be arranged to generate meta-attributes when metadata field information associated with the community visualizations is processed.

At block 1206, in one or more of the various embodiments, recommendation engines may be arranged to determine one or more meta-attributes that may be common to an anchor visualization and the one or more recommended visualizations. In some embodiments, common meta-attributes may be meta-attributes that are same across all of the recommended visualizations and the anchor visualization.

In some embodiments, recommendation engines may be arranged to employ different "sameness" rules, such as, equality, pattern matching, fuzzy matching, or the like for determine the common meta-attributes. Accordingly, in some embodiments, the recommendation model or other configuration information may include the rules or instruction for determining sameness for a given metadata field.

At block 1208, in one or more of the various embodiments, recommendation engines may be arranged to tokenize the one or more common meta-attributes values (or metadata field values associated with the common meta-attributes) and determine the frequency of each token.

For example, in some embodiments, if 'fieldname_region', 'tablename_campaign', fieldname_profit', fieldname-_campaign name', 'datasource_marketing', or the like, are determined to be common meta-attributes, tokenizing them may produce tokens, such as, region, campaign, profit, campaign, name, marketing, or the like.

In some embodiments, if the tokens may be generated, recommendation engines may be arranged to determine the frequency of occurrence of each token. In the example above, frequency determination would provide (region, 1), (campaign, 2), (name, 1), (marketing, 1), or the like, with the number of occurrences of each token associated with the given token. Note, one of ordinary skill in the art will appreciate that recommendation engines may employ other data structures or data representations to represent token frequency information rather than being limited to using pairs or tuples.

At block 1210, in one or more of the various embodiments, recommendation engines may be arranged to perform a permission/sensitivity evaluation of the tokens. In one or more of the various embodiments, recommendation engines may be arranged to restrict users from viewing one or more metadata fields depending on user access privileges. Thus, in some embodiments, some users may be restricted from viewing one or more meta-attributes, metadata fields, tokens, or the like. Accordingly, in one or more of the various embodiments, recommendation engines may be arranged to filter one or more of metadata fields, meta-attributes, tokens, or the like, depending on configuration information or the recommendation model.

At block 1212, in one or more of the various embodiments, recommendation engines may be arranged to rank order the one or more tokens based on the frequency of their occurrence. In one or more of the various embodiments, recommendation engines may be arranged to sort the remaining (after filtering for permission/privacy) tokens based their frequency of occurrence. Accordingly, in some embodiments, in this context, frequency of occurrence may be considered an influence score for the metadata fields.

At block 1214, in one or more of the various embodiments, recommendation engines may be arranged to the top ranked tokens to a user interface for display to a user. In one or more of the various embodiments, these top ranked tokens may be provided to users to provide them an explanation for why the recommended visualizations were selected. For example, if the top ranked tokens are Sales, Profits, and Revenue, an explanation narrative such as "These visualizations are recommended to you based on Sales, Profits, or Revenue."

Next, in one or more of the various embodiments, control may be returned to a calling process.

Figure 13:
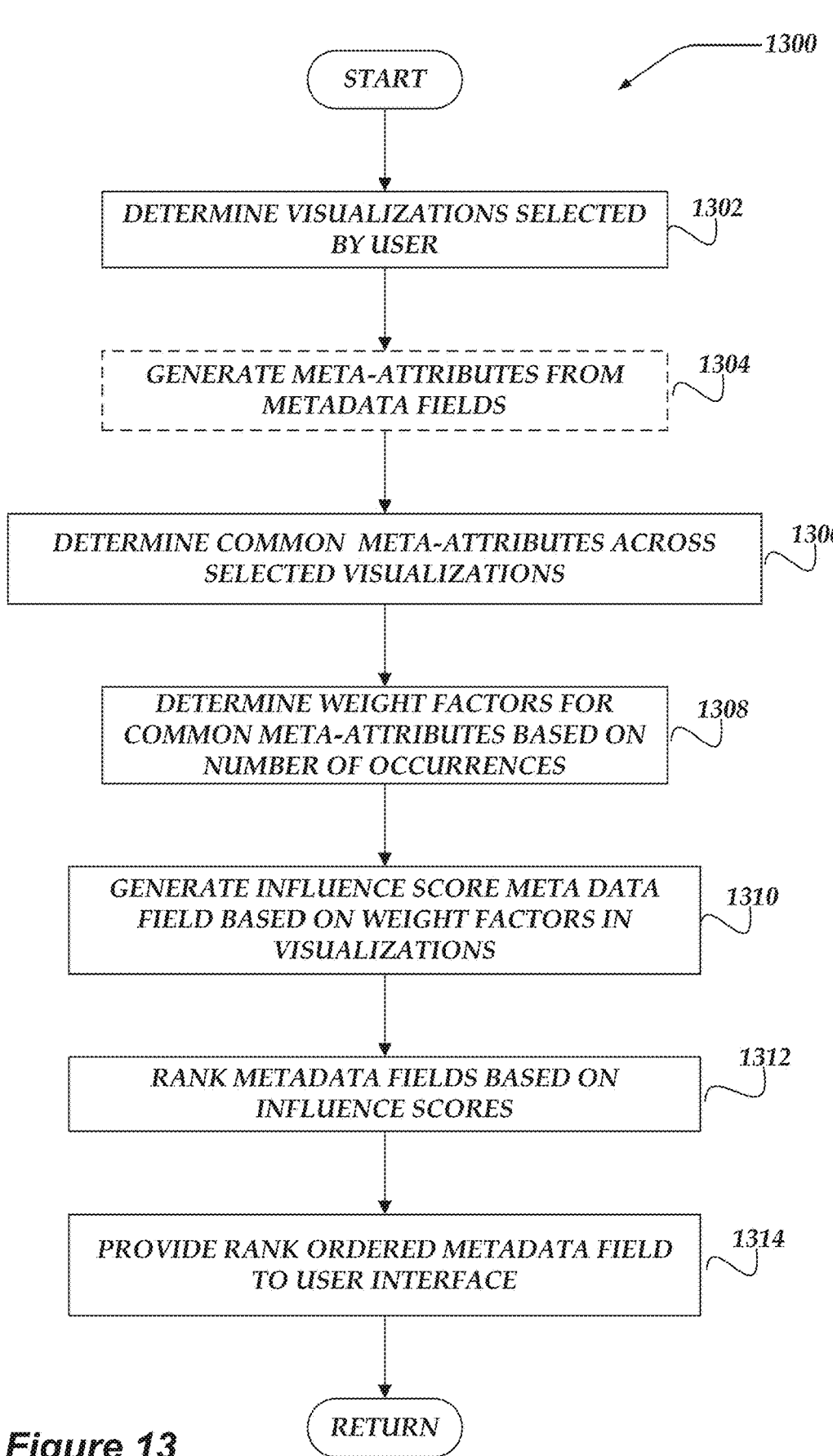
FIG. 13 is a flowchart for a process for evaluating metadata fields influence between selected recommended visualizations in accordance with one or more of the various embodiments.

FIG. 13 illustrates a flowchart for process 1300 for evaluating metadata field influence between selected visualizations in accordance with one or more of the various embodiments. After a start block, at block 1302, in one or more of the various embodiments, a user may be enabled to select two or more visualizations. In some embodiments, user may select the two or more visualizations via a user interface that may be displaying or referencing a plurality of visualizations. In some embodiments, the two or more visualizations may include an anchor visualization, or one or more recommended visualizations.

At block 1304, in one or more of the various embodiments, optionally, recommendation engines may be arranged to generate meta-attributes based on the metadata fields associated with the anchor visualization and the one or more recommended visualizations.

In one or more of the various embodiments, meta-attributes may be generated similar as described for block 1204 in process 1200.

Note, this block is marked optional because in some embodiments, meta-attributes may be generated prior to the execution of process 1300. For example, recommendation engines may be arranged to generate meta-attributes when metadata field information associated with the community visualizations is processed.

At block 1306, in one or more of the various embodiments, recommendation engines may be arranged to determine the common meta-attributes in the two or more selected visualizations. In some embodiments, common meta-attributes may be meta-attributes that are same across all of the two or more selected visualizations.

In some embodiments, recommendation engines may be arranged to employ different "sameness" rules, such as, equality, pattern matching, fuzzy matching, or the like for determine the common meta-attributes. Accordingly, in some embodiments, the recommendation model or other configuration information may include the rules or instruction for determining sameness for a given metadata field.

At block 1308, in one or more of the various embodiments, recommendation engines may be arranged to determine one or more weight factors for the common meta-attributes based on the occurrences of the meta-attributes in the two or more selected visualizations. In one or more of the various embodiments, recommendation engines may be arranged to determine the occurrence count for each common meta-attribute.

At block 1310, in one or more of the various embodiments, recommendation engines may be arranged to generate an influence score for metadata fields based on the product of the meta-attributes weight factors.

For example, if the meta-attribute occurrence counts for the anchor visualization are (fieldname_a, 2), (fieldname_b, 2), (fieldname_c, 1), and (fieldname_d, 1); and the meta-attribute occurrence counts for the selected visualization are (fieldname_a, 1), fieldname_b, 1), (fieldname_c, 3), and (fieldname_d, 1); the meta-attributes influence scores may be (fieldname_c, $1*3=3$), (fieldname_a, $2*1=2$), (fieldname_b, $2*1=2$), and (fieldname_d, $1*1=1$).

At block 1312, in one or more of the various embodiments, recommendation engines may be arranged to rank the metadata fields based on their corresponding metadata fields.

At block 1314, in one or more of the various embodiments, recommendation engines may be arranged to provide the rank ordered metadata fields to a user interface for display to the user. In one or more of the various embodiments, the top ranked metadata fields may be employed in an explanation why the two or more visualizations were considered related with respect to recommendations based on the anchor visualization.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of these innovations.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed is:

1. A method for providing relevant related data visualizations, performed at a computing device having a display, one or more processors and memory storing one or more programs configured for execution by the one or more processors, the method comprising:

displaying a data visualization according to a data source, the data visualization including display of one or more first data fields from the data source, and displayed according to one or more associated first metadata fields;

identifying a collection of predefined data visualizations for the data source, where the collection of predefined data visualizations are stored in association with a selected organization;

for each predefined data visualization in the collection, computing a respective ranking according to a plurality of influence scores, each influence score is computed according to comparing data fields and metadata fields of the respective predefined data visualization to the one or more first data fields and the one or more associated first metadata fields and each influence score is computed using a recommendation model that uses natural language processing of text content included in the metadata fields of the respective predefined data visualizations, wherein the recommendation model is trained on metadata fields of the collection of predefined data visualizations that are stored in association with the selected organization and metadata fields of data visualization other than the collection of predefined data visualizations that are stored in association with the selected organization;

selecting a subset of the predefined data visualizations that have top ranking; and providing a report that includes an ordered list of the selected subset of predefined data visualizations, including at least one influence score for each of the predefined data visualizations in the ordered list.

2. The method of claim 1, wherein computing the respective ranking comprises generating meta-attributes for the metadata fields by combining metadata field labels with their respective metadata field values, tokenizing the meta-attributes, sorting tokens of the meta-attributes, and rank ordering the tokens based on frequency of their occurrence.

3. The method of claim 1, wherein identifying the collection of predefined data visualizations comprises excluding one or more data visualizations associated with one or more metadata field values.

4. The method of claim 1, wherein identifying the collection of predefined data visualizations comprises excluding one or more data visualizations based on one or more missing metadata field values.

5. The method of claim 1, wherein identifying the collection of predefined data visualizations comprises excluding one or more data visualizations depending on the recommendation model.

6. The method of claim 1, wherein computing the respective ranking comprises mapping dominant topics to their associated metadata fields to evaluate an influence score of each metadata field.

7. The method of claim 6, wherein computing the respective ranking further comprises determining the dominant topics for the respective predefined data visualization based on values included in the metadata fields.

8. The method of claim 1, wherein each influence score is based on a count of a number of data visualizations that share a same value.

9. The method of claim 1, wherein providing the report comprises providing a narrative for a predefined data visualization based on its top ranked meta-data fields.

10. A system for visualizing data:

one or more processors;

memory coupled to the one or more processors;

a display; and one or more programs stored in the memory and configured for execution by the one or more processors, the one or more programs comprising instructions for:

displaying a data visualization according to a data source, the data visualization including display of one or more first data fields from the data source, and displayed according to one or more associated first metadata fields;

identifying a collection of predefined data visualizations for the data source, where the collection of predefined data visualizations are stored in association with a selected organization;

for each predefined data visualization in the collection, computing a respective ranking according to a plurality of influence scores, each influence score is computed according to comparing data fields and metadata fields of the respective predefined data visualization to the one or more first data fields and the one or more associated first metadata fields and each influence score is computed using a recommendation model that uses natural language processing of text content included in the metadata fields of the respective predefined data visualizations, wherein the recommendation model is trained on metadata fields of the collection of predefined data visualizations that are stored in association with the selected organization and metadata fields of data visualization other than the collection of predefined data visualizations that are stored in association with the selected organization;

selecting a subset of the predefined data visualizations that have top ranking; and providing a report that includes an ordered list of the selected subset of predefined data visualizations, including at least one influence score for each of the predefined data visualizations in the ordered list.

11. The system of claim 10, wherein computing the respective ranking comprises generating meta-attributes for the metadata fields by combining metadata field labels with their respective metadata field values, tokenizing the meta-attributes, sorting tokens of the meta-attributes, and rank ordering the tokens based on frequency of their occurrence.

12. The system of claim 10, wherein identifying the collection of predefined data visualizations comprises excluding one or more data visualizations associated with one or more metadata field values.

13. The system of claim 10, wherein identifying the collection of predefined data visualizations comprises excluding one or more data visualizations based on one or more missing metadata field values.

14. The system of claim 10, wherein identifying the collection of predefined data visualizations comprises excluding one or more visualizations depending on the recommendation model.

15. The system of claim 10, wherein computing the respective ranking comprises mapping dominant topics to their associated metadata fields to evaluate an influence score of each metadata field.

16. The system of claim 15, wherein computing the respective ranking further comprises determining the dominant topics for the respective predefined data visualization based on values included in the metadata fields.

17. The system of claim 10, wherein each influence score is based on a count of a number of data visualizations that share a same value.

18. The system of claim 10, wherein providing the report comprises providing a narrative for a predefined data visualization based on its top ranked meta-data fields.

19. A non-transitory computer readable storage medium storing one or more programs, the one or more programs configured for execution by a computing device having one or more processors, memory, and a display, the one or more programs comprising instructions for:

displaying a data visualization according to a data source, the data visualization including display of one or more first data fields from the data source, and displayed according to one or more associated first metadata fields;

identifying a collection of predefined data visualizations for the data source, where the collection of predefined data visualizations are stored in association with a selected organization;

for each predefined data visualization in the collection, computing a respective ranking according to a plurality of influence scores, each influence score is computed according to comparing data fields and metadata fields of the respective predefined data visualization to the one or more first data fields and the one or more associated first metadata fields and each influence score is computed using a recommendation model that uses natural language processing of text content included in the metadata fields of the respective predefined data visualizations, wherein the recommendation model is trained on metadata fields of the collection of predefined data visualizations that are stored in association with the selected organization and metadata fields of data visualization other than the collection of predefined data visualizations that are stored in association with the selected organization;

selecting a subset of the predefined data visualizations that have top ranking; and providing a report that includes an ordered list of the selected subset of predefined data visualizations, including at least one influence score for each of the predefined data visualizations in the ordered list.

20. The non-transitory computer readable storage medium of claim 19, wherein computing the respective ranking comprises generating meta-attributes for the metadata fields by combining metadata field labels with their respective metadata field values, tokenizing the meta-attributes, sorting tokens of the meta-attributes, and rank ordering the tokens based on frequency of their occurrence.

* * * * *